US008167714B2

(12) United States Patent
Tawara et al.

(10) Patent No.: US 8,167,714 B2
(45) Date of Patent: May 1, 2012

(54) PUZZLE GAME APPARATUS AND COMPUTER READABLE STORAGE MEDIUM HAVING PUZZLE GAME PROGRAM STORED THEREON

(75) Inventors: Masaki Tawara, Kyoto (JP); Yuuki Sukekuni, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1180 days.

(21) Appl. No.: 11/987,955

(22) Filed: Dec. 6, 2007

(65) Prior Publication Data

US 2009/0072478 A1 Mar. 19, 2009

(30) Foreign Application Priority Data

Sep. 14, 2007 (JP) ................................ 2007-239130

(51) Int. Cl.
 *A63F 3/04* (2006.01)
(52) U.S. Cl. .......................................... 463/30; 463/37
(58) Field of Classification Search ................ 463/9, 31, 463/30, 37; 715/254
 See application file for complete search history.

(56) References Cited

U.S. PATENT DOCUMENTS

| | | | | |
|---|---|---|---|---|
| 6,579,177 B2 * | 6/2003 | Mraovic | ............................ | 463/9 |
| 2003/0199293 A1 * | 10/2003 | Skripachev et al. | ............... | 463/9 |
| 2007/0262984 A1 * | 11/2007 | Pruss | ............................ | 345/420 |
| 2008/0102912 A1 * | 5/2008 | Tawara et al. | ..................... | 463/9 |
| 2010/0229082 A1 * | 9/2010 | Karmarkar et al. | ........... | 715/205 |

OTHER PUBLICATIONS

Gordon, Peter, "Battleships Solving Guide", © 1998, pp. 1-12, downloadable from http://web.archive.org/web/20061115014304/ http://www.mountainvistasoft.com/docs/BtlshipSolyGuide.pdf.*
Microsoft, "Minesweeper" (computer game), original version (c) 1990, as evidenced by the screenshot "minsweeper-screenshot.pdf" taken from Windows XP. Shipped with every version of windows since Windows 3.1 in 1992.*
MountainVista, "Fathom it" (computer game), original version (c) 1997, as evidenced by the enclosed screenshots downloaded from http://www.mountainvistasoft.com/fihelp/tutorial_1.htm ttp:// www.mountainvistasoft.com/fihelp/tutorial_2.htm http://www. mountainvistasoft.com/fihelp/tutorial_3.htm.*
Hastilow, Yariv; "World of CryptoPics" (video game), (c) 2004, evidenced by the furnished help file and screen shots document. Game is freely downloadable from http://www.download.cnet. com.*
"Picross 2", [online], by Nintendo, searched on Sep. 13, 2006 through the internet <URL:http://www.nintendo.co.jp/n02/dmg/ ap2j/index.html> [Partial Translation Attached].

* cited by examiner

*Primary Examiner* — Peter DungBa Vo
*Assistant Examiner* — Nicholas DiToro
(74) *Attorney, Agent, or Firm* — Nixon & Vanderhye P.C.

(57) ABSTRACT

In a solution area which has a plurality of cells arranged in a matrix thereof, a connective cell, which is obtained by interrelating a predetermined plurality of cells with one another, is displayed. Further, a normal numerical clue, which is caused to correspond to a row and a column in the matrix and represents the number of cells to be marked in the corresponding row and column, is displayed. Still further, a large numerical clue, which represents the number of cells to be marked in a contiguous form over a plurality of adjoining rows or a plurality of adjoining columns, is displayed so as to range over the plurality of rows or the plurality of columns. In accordance with an operation performed by a player, specific cells are marked, and then whether or not a set of the marked cells presents a figure which is a solution of a puzzle having been previously set.

25 Claims, 32 Drawing Sheets

F I G. 1 9
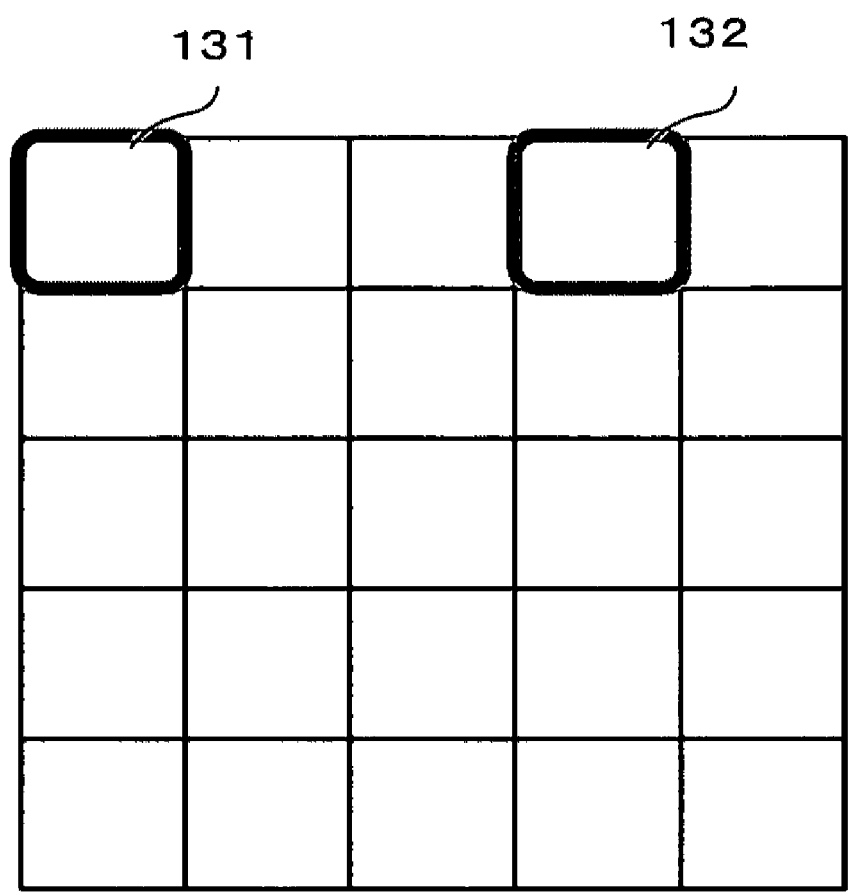

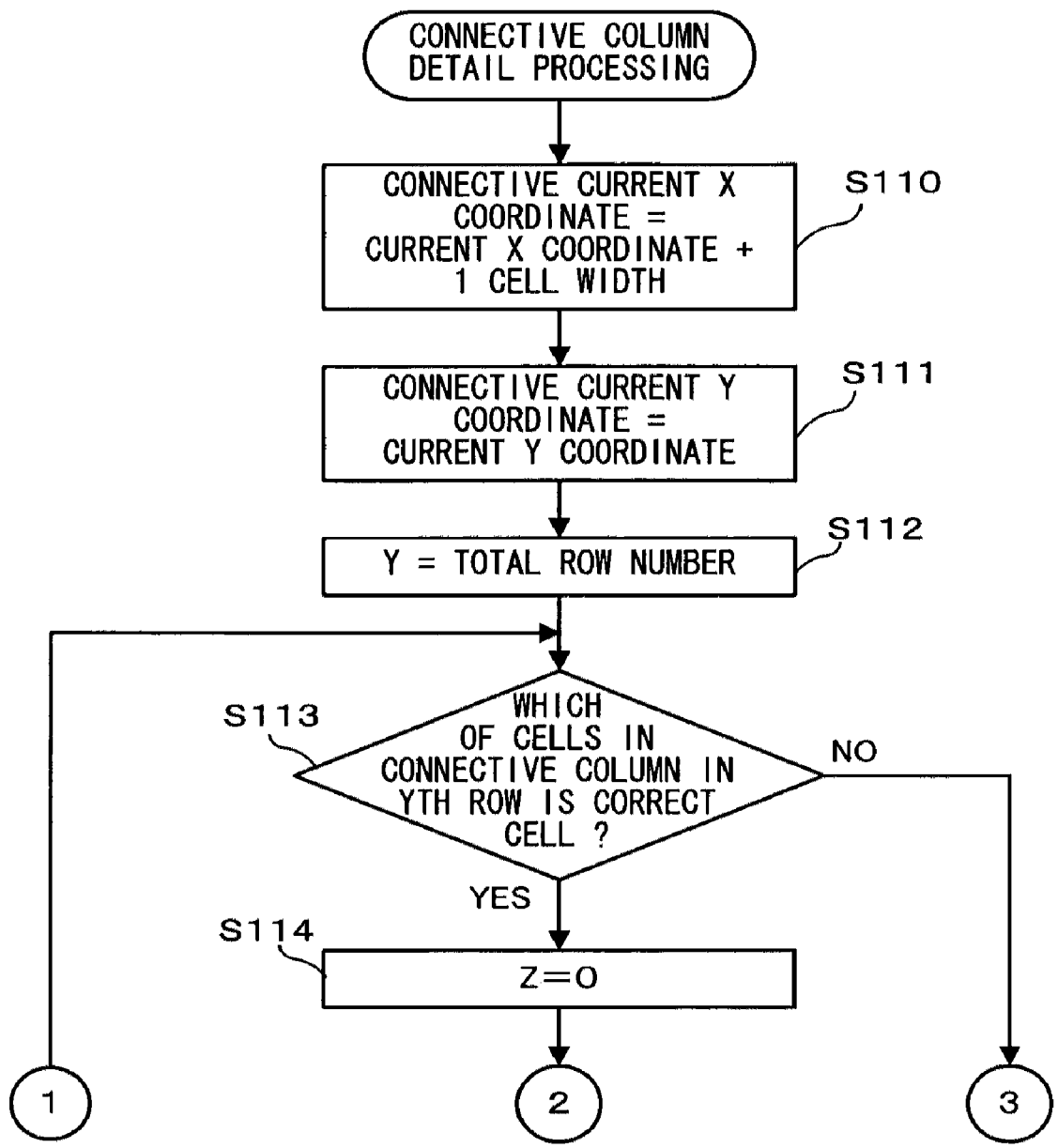
F I G. 3 0

PUZZLE GAME APPARATUS AND COMPUTER READABLE STORAGE MEDIUM HAVING PUZZLE GAME PROGRAM STORED THEREON

CROSS REFERENCE TO RELATED APPLICATION

The disclosure of Japanese Patent Application No. 2007-239130, filed on Sep. 14, 2007, is incorporated herein by reference.

BACKGROUND OF THE INVENTION

1. Field of the Invention

The present invention relates to a puzzle game apparatus and a computer readable storage medium having a puzzle game program stored thereon. More specifically, the present invention relates to a puzzle game apparatus and a computer readable storage medium having stored thereon a puzzle game program which fill in a plurality of cells arranged in a matrix manner in accordance with predetermined numerical clues.

2. Description of the Background Art

Conventionally, known is a puzzle game, in which cells to be filled in are identified, from cells arranged in a plurality of rows and columns, by using numbers as clues (numerical clues), each number being displayed for each of the rows and each of the columns, and a picture (letter) eventually appears after the cells are filled in accordingly. The puzzle game is generally called as a picture crossword puzzle. A game program operable to execute such a puzzle game on an electronic game apparatus and a game apparatus executing the game program are also known (e.g., "Picross 2", [online], by Nintendo, searched on Sep. 13, 2006 through the Internet <URL: http://www.nintendo.co.jp/n02/dmg/ap2j/index.html>, hereinafter referred to as non-patent document). In this game program, 15×15 cells are displayed, and numerical clues are displayed on an upper portion and a left portion of the cells. In addition, a technique of enlarging and displaying a numerical clue which corresponds to cells to be filled in by a player is disclosed.

However, the game program disclosed in the above-described non-patent document has the following problem. In the above-described game program, although the numerical clue is enlarged and displayed so as to be viewed easily by the player, each of the numerical clues corresponds to only one or one column. Further, all the cells are of a uniform size. Therefore, a problem is posed in that the game tends to become monotonous, and the player tends to get bored after playing the game for a long time.

SUMMARY OF THE INVENTION

Therefore, a novel puzzle game apparatus and a computer readable storage medium having a puzzle game program stored thereon is disclosed herein.

Note that the reference numerals, additional explanations and the like in parentheses in this section of the specification indicate the correspondence with the embodiment described later for the sake of easy understanding of the present invention, and do not limit the present invention in any way.

A first aspect is a puzzle game apparatus comprising solution area display means (S2), connective cell setting means (S23, S24), connective state display means (S26), clue area display means (S3), normal numerical clue display means (S35), large numerical clue display means (S34), cell identification means (S5), cell marking means (S7, S9), and correct solution determination means (S11). The solution area display means displays a solution area having a plurality of cells arranged in a matrix thereof. The connective cell setting means causes a plurality of cells, among the cells arranged in the solution area, to interrelate with one another so as to form a connective cell. The connective state display means performs a display which indicates that the cells caused to interrelate with one another by the connective cell setting means form the connective cell. The clue area display means displays a clue area in which a plurality of numbers, each representing the number of cells to be marked among the cells arranged in the solution area, are displayed. The normal numerical clue display means displays a normal numerical clue, which is caused to correspond to a row or a column in the matrix and represents the number of cells to be marked in the row or the column, in an area corresponding to the row or the column in the clue area. The large numerical clue display means displays a large numerical clue, which represents the number of cells to be marked in a contiguous form over a plurality of adjoining rows or a plurality of adjoining columns in the matrix, in an area which ranges over and corresponds to the plurality of adjoining rows or the plurality of adjoining columns in the clue area. The cell identification means identifies a cell to be marked, among the cells in the solution area, in accordance with an operation by a player. The cell marking means marks and displays the cell identified by the cell identification means. The correct solution determination means determines whether or not a set of cells marked by the cell marking means presents a figure which is a correct solution of a puzzle having been previously set.

According to the first aspect, the connective cell is arranged in the solution area, and the numerical clue is displayed so as to shown the number of the cells to be marked, the cells ranging over a plurality of rows or a plurality of columns, whereby amusingness of the puzzle game can be improved. Accordingly, a novel manner of enjoyment can be provided to those players who are not satisfied with conventional picture crossword puzzles.

According to a second aspect based on the first aspect, when the cell identified by the cell identification means is the connective cell, the cell marking means marks all cells which are caused to interrelate with one another as the connective cell.

According to the second aspect, operability of the puzzle game can be improved.

According to a third aspect based on the first aspect, the connective state display means causes a plurality of the cells, which form the connective cell, to be connected to one another so as to be displayed as one cell on the solution area.

According to the third aspect, the connective cells can be presented in the solution area so as to be easily recognized by the player.

According to a fourth aspect based on the first aspect, the puzzle game apparatus further comprises cell information storage means for storing cell information which relates to each of the cells arranged in the solution area and which indicates whether or not said each of the cells forms a part of the connective cell. Further, the connective cell setting means reads the cell information from the cell information storage means, and causes a plurality of the cells to interrelate with one another in accordance with the read cell information so as to form the connective cell.

According to the fourth aspect, the same effect as the first aspect can be attained.

According to a fifth aspect based on the first aspect, the puzzle game apparatus further comprises correct solution information storage means and numerical clue generation means. The correct solution information storage means stores correct solution information which indicates a marking state in the case of a correct solution, with respect to each of the cells arranged in the solution area. The numerical clue generation means reads the correct solution information, and generates the normal numerical clues and the large numerical clues in accordance with the correct solution information. Further, the normal numerical clue display means displays the normal numerical clues generated by the numerical clue generation means. The large numerical clue display means displays the large numerical clues generated by the numerical clue generation means.

According to the fifth aspect, information relating to the numerical clue is not necessarily stored in a memory card or the like in advance, and thus a storage capacity of the puzzle game can be saved.

A sixth aspect is a puzzle game apparatus comprising solution area display means (S2), clue area display means (S3), normal numerical clue display means (S35), large numerical clue display means (S34), cell identification means (S5), cell marking means (S7, S9), and correct solution determination means (S11). The solution area display means displays a solution area having a plurality of cells arranged in a matrix thereof. The clue area display means displays a clue area in which a plurality of numbers each representing the number of cells to be marked, among the cells displayed in the solution area, are displayed. The normal numerical clue display means displays a normal numerical clue, which is caused to correspond to a row or a column in the matrix and represents the number of cells to be marked in the row or the column, in an area corresponding to the row or the column in the clue area. The large numerical clue display means displays a large numerical clue, which represents the number of cells to be marked in a contiguous form over a plurality of adjoining rows or a plurality of adjoining columns in the matrix, in an area which ranges over and corresponds to the plurality of adjoining rows or the plurality of adjoining columns in the clue area. The cell identification means identifies a cell to be marked, among the cells in the solution area, in accordance with an operation by a player. The cell marking means marks and displays the identified cell. The correct solution determination means determines whether or not a set of cells marked by the cell marking means presents a figure which is a correct solution of a puzzle having been previously set.

According to the sixth aspect, the numerical clue is displayed so as to show the number of cells to be marked, the cells ranging over the plurality of columns or the plurality of rows, whereby amusingness of the puzzle game can be improved.

A seventh aspect is a puzzle game apparatus comprising solution area display means (S2), connective cell setting means (S23, 24), connective state display means (S26), clue area display means (S3), numerical clue display means (S35), cell identification means (S5), cell marking means (S7, S9), and correct solution determination means (S11). The solution area display means displays a solution area having a plurality of cells arranged in a matrix thereof. The connective cell setting means causes a plurality of cells, among the cells arranged in the solution area, to interrelate with one another so as to form a connective cell. The connective state display means performs a display which indicates that the cells caused to interrelate with one another by the connective cell setting means form the connective cell. The clue area display means displays a clue area in which a plurality of numbers, each representing the number of cells to be marked among the cells arranged in the solution area, are displayed. The numerical clue display means displays a numerical clue, which is caused to correspond to a row or a column in the matrix and represents the number of cells to be marked in the row or the column, in an area corresponding to the row or the column in the clue area. The cell identification means identifies a cell to be marked, among the cells in the solution area, in accordance with an operation by a player. The cell marking means marks and displays the identified cell. The correct solution determination means determines whether or not a set of cells marked by the cell marking means presents a figure which is a correct solution of a puzzle having been previously set.

According to the seventh aspect, the connective cell is arranged in the solution area, whereby amusingness of the puzzle game can be improved.

An eighth aspect is a puzzle game program executed by a computer of a game apparatus, and a computer readable storage medium having stored thereon a puzzle game program comprising a solution area display step (S2), a connective cell setting step (S23, 24), a connective state display step (S26), a clue area display step (S3), a normal numerical clue display step (S35), a large numerical clue display step (S34), a cell identification step (S5), a cell marking step (S7, S9), and a correct solution determination step (S11). The solution area display step displays a solution area having a plurality of cells arranged in a matrix thereof. The connective cell setting step causes a plurality of cells, among the cells displayed in the solution area, to interrelate with one another so as to form a connective cell. The connective state display step performs a display which indicates that the cells caused to interrelate with one another by the connective cell setting step form the connective cell. The clue area display step displays a clue area in which a plurality of numbers, each representing the number of cells to be marked among the cells arranged in the solution area, are displayed. The normal numerical clue display step displays a normal numerical clue, which is caused to correspond to a row or a column in the matrix and represents the number of cells to be marked in the row or the column, in an area corresponding to the row or the column in the clue area. The large numerical clue display step displays a large numerical clue, which represents the number of cells to be marked in a contiguous form over a plurality of adjoining rows or a plurality of adjoining columns in the matrix, in an area which ranges over and corresponds to the plurality of adjoining rows and the plurality of adjoining columns in the clue area. The cell identification step identifies a cell to be marked, among the cells in the solution area, in accordance with an operation by a player. The cell marking step marks and displays the identified cell. The correct solution determination step determines whether or not a set of cells marked by the cell marking step presents a figure which is a correct solution of a puzzle having been previously set.

According to the eighth aspect, the same effect as the first aspect can be attained.

A ninth aspect is a puzzle game program executed by a computer of a game apparatus, and a computer readable storage medium having stored thereon a puzzle game program comprising a solution area display step (S2), a clue area display step (S3), a normal numerical clue display step (S35), a large numerical clue display step (S34), a cell identification step (S5), a cell marking step (S7, S9), and a correct solution determination step (S11). The solution area display step displays a solution area having a plurality of cells arranged in a matrix thereof. The clue area display step displays a clue area in which a plurality of numbers, each representing the number of cells to be marked among the cells displayed on the solution area, are displayed. The normal numerical clue display step displays a normal numerical clue, which is caused to correspond to a row or a column in the matrix and represents the number of cells to be marked in the row or the column, in an area corresponding to the row or the column in the clue area. The large numerical clue display step displays a large numerical clue, which represents the number of cells to be marked in a contiguous form over a plurality of adjoining rows or a plurality of adjoining columns in the matrix, in an area which ranges over and corresponds to the plurality of adjoining rows and the plurality of adjoining columns in the clue area. The cell identification step identifies a cell to be marked, among the cells in the solution area, in accordance with an operation by a player. The cell marking step marks and displays the identified cell. The correct solution determination step determines whether or not a set of cells marked by the cell marking step presents a figure which is a correct solution of a puzzle having been previously set.

According to the ninth aspect, the same effect as the sixth aspect can be attained.

According to an embodiment of the present invention, a novel puzzle game can be provided, and in addition, a new entertainment can be provided to the player.

These and other objects, features, aspects and advantages of the present invention will become more apparent from the following detailed description of the embodiment(s) of the present invention when taken in conjunction with the accompanying drawings.

BRIEF DESCRIPTION OF THE DRAWINGS

FIG. 10 is a diagram showing an exemplary data structure of question data 249a;

FIG. 11 is a diagram showing an exemplary data structure of cell information 254a;

FIG. 12 is a diagram showing an exemplary data structure of a numerical clue 255a;

FIG. 19 is a diagram showing an exemplary formation of the connective cell;

FIG. 30 is a flow chart showing, in detail, connective-column detail processing illustrated in step S108 shown in FIG. 29;

DESCRIPTION OF THE PREFERRED EMBODIMENTS

Hereinafter, an embodiment of the present invention will be described, with reference to drawings. Note that this embodiment does not limit the scope of the present invention in any way.

Figure 1:
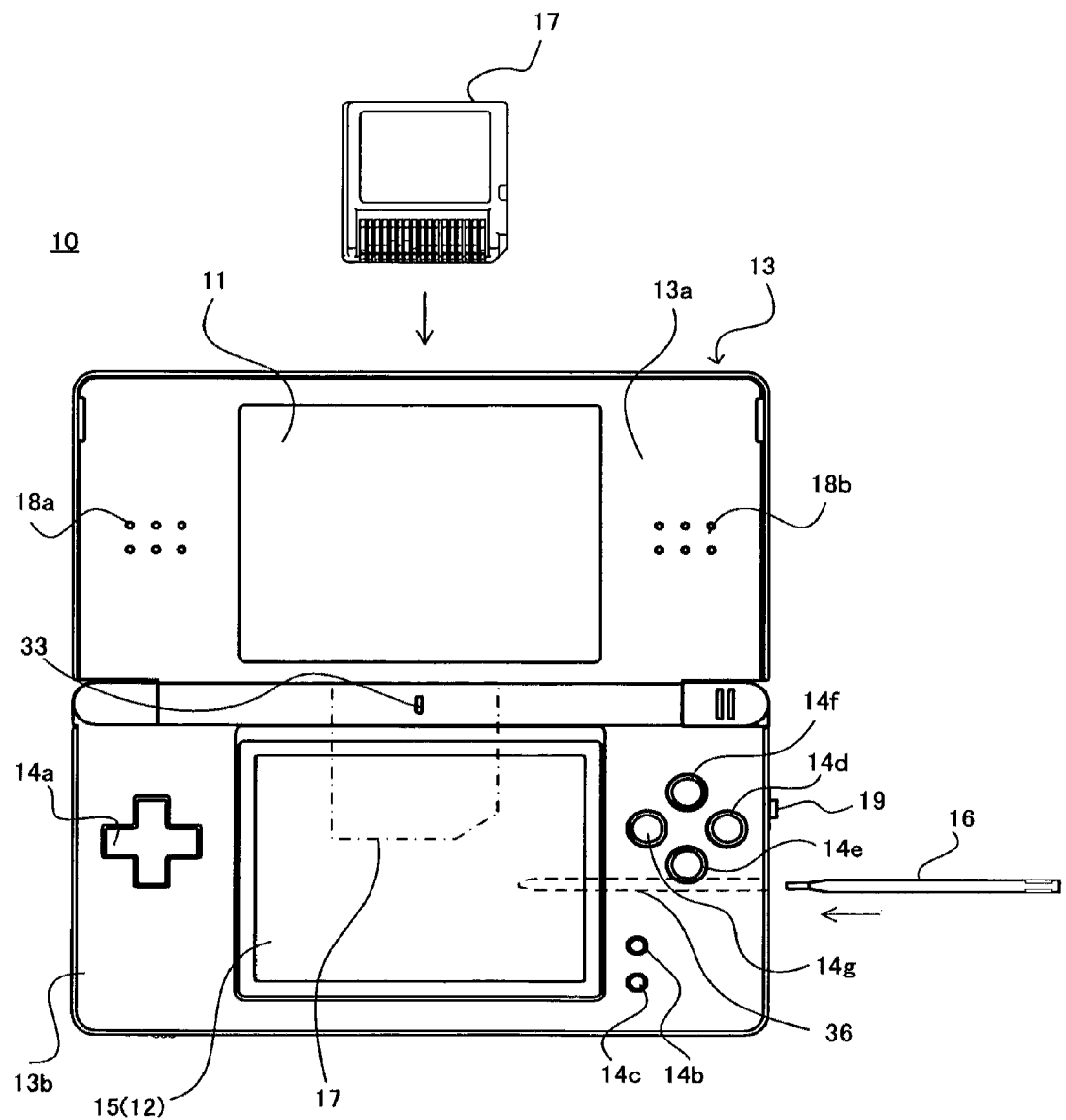
FIG. 1 is a view illustrating an outer appearance of a hand-held game apparatus according to an embodiment of the present invention.
Figure 2:
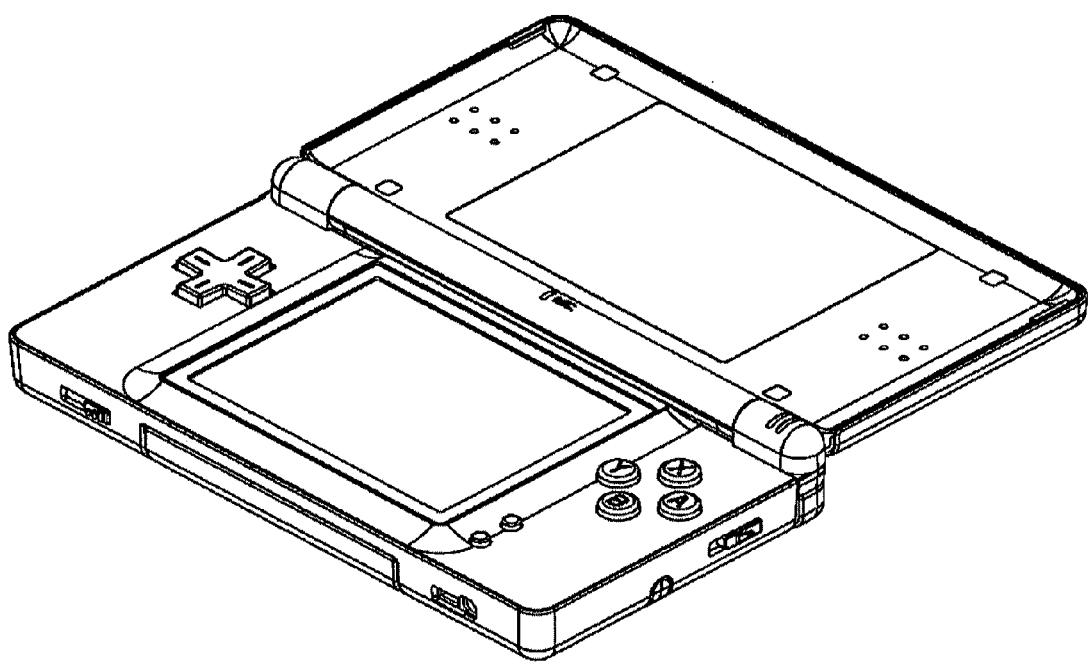
FIG. 2 is a perspective view of the hand-held game apparatus 10 according to the embodiment of the present invention.

Prior to detailed explanations of respective embodiments, a configuration of a game apparatus which is commonly used in each of the embodiments will be described. FIG. 1 is a view illustrating an outer appearance of a game apparatus 10 according to one embodiment of the present invention. FIG. 2 is a perspective view of the game apparatus 10. As shown in FIG. 1, the game apparatus 10 includes a first LCD (Liquid Crystal Display), and a second LCD 12. A housing 13 is constituted of an upper housing 13a and a lower housing 13b. The first LCD 11 is accommodated in the upper housing 13a, and the second LCD 12 is accommodated in the lower housing 13b. Each of the first LCD 11 and the second LCD 12 has a resolution of 256 dots×192 dots. In the present embodiment, an LCD is used as a display device, and may be replaced with any other display device such as a display device using an EL (Electro Luminescence), for example. Further, the resolution may be chosen arbitrarily.

On the upper housing 13a, provided are sound holes 18a and 18b for outputting a sound from a pair of loudspeakers (30a and 30b shown in FIG. 3) described below.

On a hinge section which connects the upper housing 13a and the lower housing 13b in a foldable manner, a microphone hole 33 is provided.

On the lower housing 13b, provided as input devices are a cross switch 14a, a start switch 14b, a select switch 14c, an A button 14d, a B button 14e, an X button 14f, and Y button 14g. Further, as another input device, the second LCD 12 has a touch panel 15 mounted on a screen thereof. In the lower housing 13b, provided are a power supply switch 19, a slot into which a memory card 17 is inserted, and a receptacle into which a stylus pen 16 is inserted.

The touch panel 15 is a resistive film type touch panel. However, not only the resistive film type, but also a given pressing type touch panel may be used. The touch panel 15 can be controlled not only with the stylus pen 16, but also with a finger of a user. In the present embodiment, the touch panel 15 has a resolution (detection accuracy) of 256 dots.times.192 dots, similar to the resolution of the second LCD 12. However, the touch panel 15 need not necessarily have the same resolution as the second LCD 12.

The memory card 17 is a computer readable storage medium having a game program stored thereon, and is detachably inserted into the slot provided in the lower housing 13b.

Next, with reference to FIG. 3, an internal configuration of the game apparatus 10 will be described.

Figure 3:
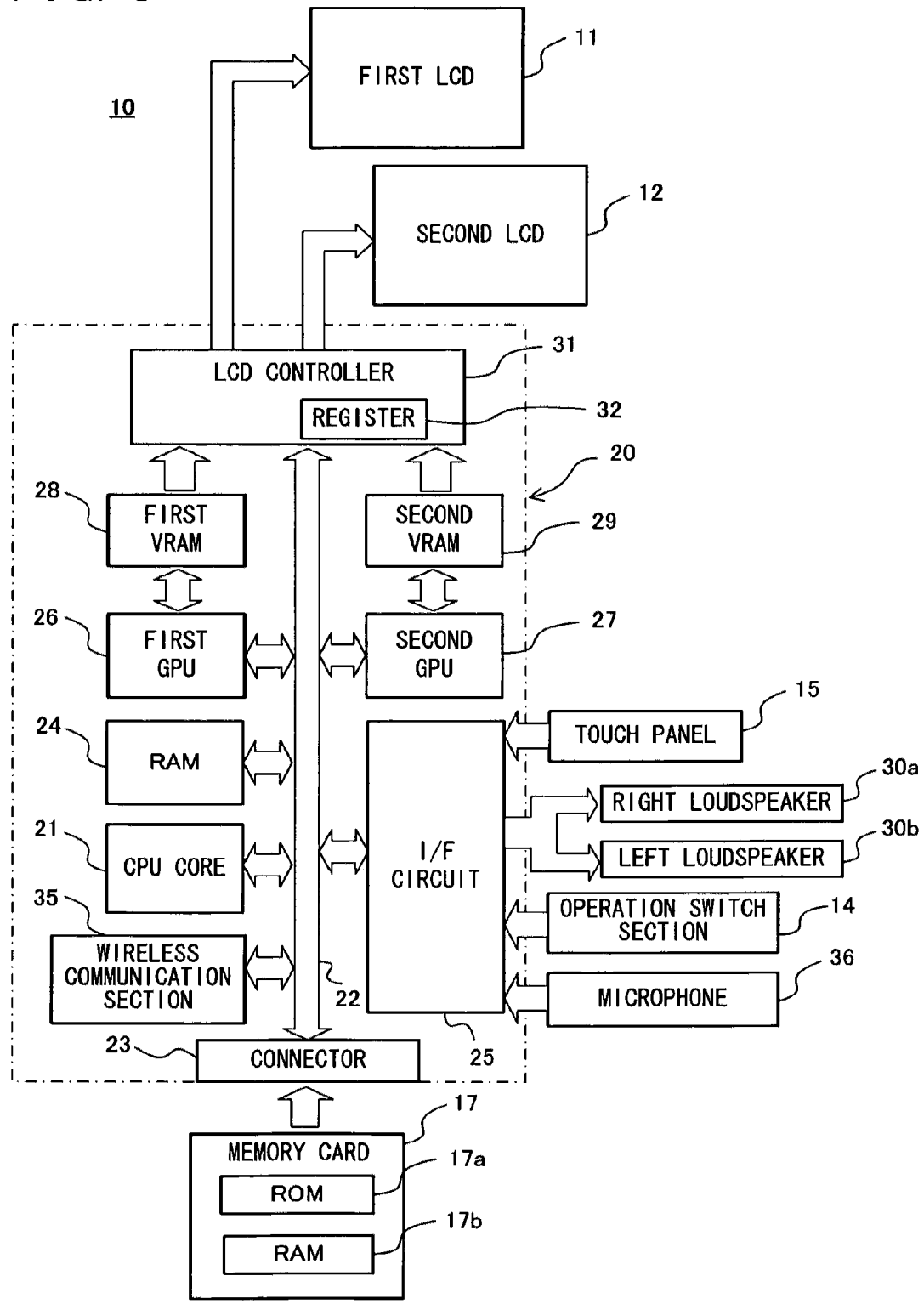
FIG. 3 is a block diagram of the hand-held game apparatus 10 according to the embodiment of the present invention.

As shown in FIG. 3, a CPU core 21 is mounted on an electronic circuit board 20 accommodated in the housing 13. Via a bus 22, the CPU core 21 is connected to a connector 23, an input/output interface circuit (denoted as I/F circuit in the drawing) 25, a first GPU (Graphics Processing Unit) 26, a second GPU 27, a RAM 24, an LCD controller 31, and a wireless communication section 35. The memory card 17 is detachably connected to the connector 23. The memory card 17 includes a ROM 17a storing a game program and a RAM 17b rewritably storing back-up data. The game program stored in the ROM 17a of the memory card 17 is loaded into the RAM 24, and the game program loaded into the RAM 24 is executed by the CPU core 21. The RAM 24 stores thereon not only the game program, but also temporary data, which is obtained after the CPU core 21 executes the game program, and data for generating a game image. The I/F circuit 25 is connected to the touch panel 15, a right loudspeaker 30a, a left loudspeaker 30b, a control switch section 14 including the cross switch 14a, the A button 14d, and the like, as shown in FIG. 1, and a microphone 36. The right loudspeaker 30a and the left loudspeaker 30b are arranged interior sides of the sound holes 18a and 18b, respectively. The microphone 36 is arranged in an interior side of a microphone hole 33.

The first GPU 26 is connected to a first VRAM (Video RAM) 28, and the second GPU 27 is connected to the second VRAM 29. In response to an instruction from the CPU core 21, the first GPU 26 generates a first game image in accordance with game image generation data which is stored in the RAM 24, and writes the first game image into the first VRAM 28. Similarly, in response to the instruction from the CPU core 21, the second GPU 27 generates a second game image, and writes the second game image into the second VRAM 29. The first VRAM 28 and the second VRAM 29 are connected to the LCD controller 31.

The LCD controller 31 includes a register 32. The register 32 stores a value "0" or "1" in accordance with the instruction from the CPU core 21. When the register 32 stores the value "0", the LCD controller 31 outputs, to the first LCD 11, the first game image which has been written into the first VRAM 28, and outputs, to the second LCD 12, the second game image which has been written into the second VRAM 29. On the other hand, when the register 32 stores the value "1", the LCD controller 31 outputs, to the second LCD 12, the first game image which has been written into the first VRAM 28, and outputs, to the first LCD 11, the second game image which has been written into the second VRAM 29.

The wireless communication section 35 has a function of exchanging data to be used for a game process or another data with a wireless communication section of another game apparatus.

The present invention is applicable not only to the game apparatus, but also to any other apparatus having a pressing type touch panel supported by a housing. For example, the present invention is applicable to a hand-held game apparatus, a controller for a stationary game apparatus, and a PDA (Personal Digital Assistant). Further, the present invention is applicable to an input device which does not has a display located under the touch panel.

Figure 4:
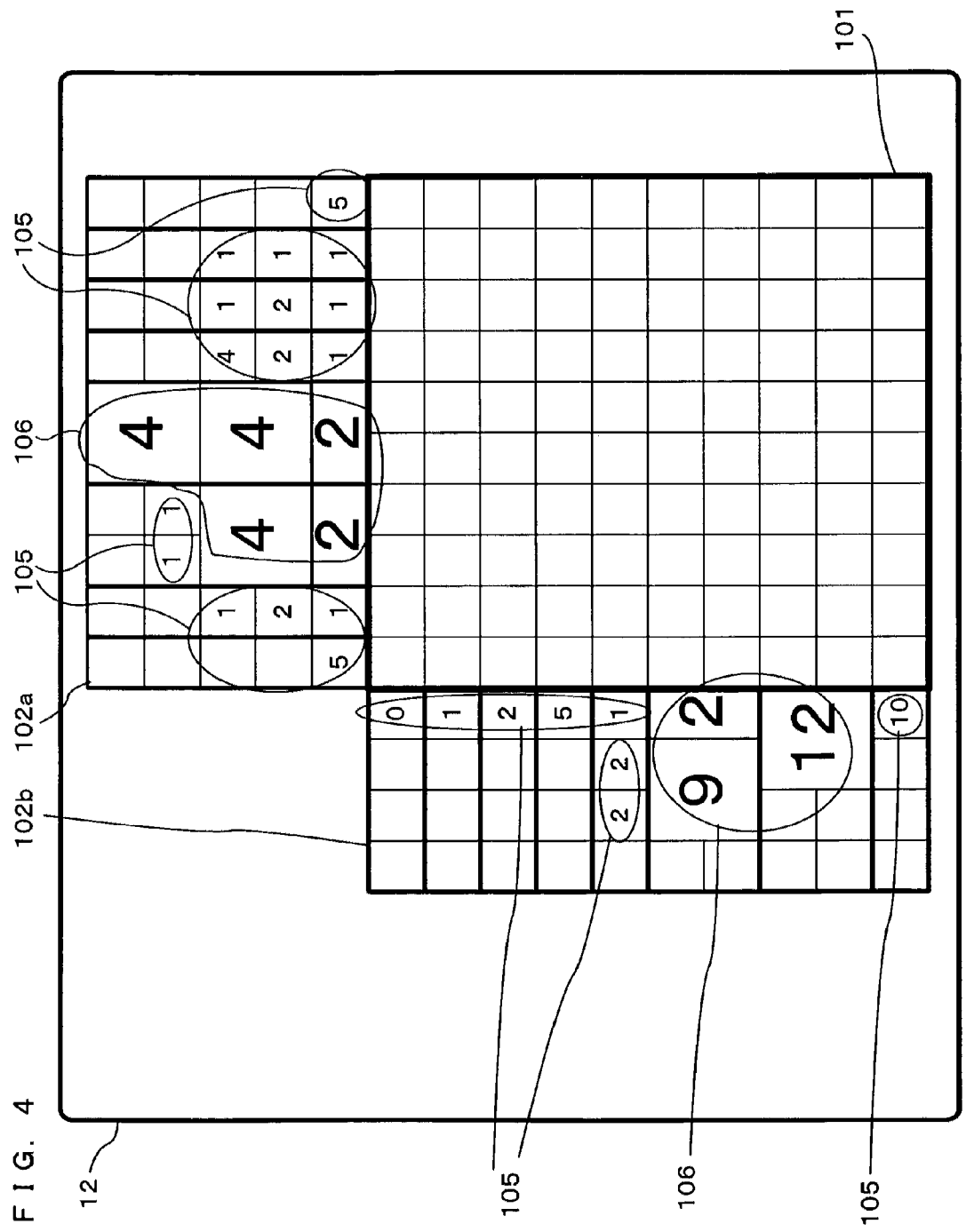
FIG. 4 is an exemplary game screen assumed in the present embodiment.

Next, with reference to FIGS. 4 to 8, an outline of a game assumed in the present embodiment will be described. FIG. 4 is an exemplary game screen assumed in the present embodiment. The game assumed in the present embodiment is, so called a picture crossword puzzle (also called as an illustration logic), in which, based on the numerical clue, cells are filled in black so as to complete a design prepared by a question maker. In FIG. 4, the whole area of a puzzle is displayed on the LCD 12. As shown in FIG. 4, the puzzle is divided into a solution area 101 and a clue area 102.

As shown in FIG. 4, the solution area 101 is a grid area having n×m cells. FIG. 4 is exemplified by 10×10 cells. The clue area 102 is an area having numerical clues displayed thereon. The clue area 102 is constituted of a clue area 102a having displayed thereon numerical clues for respective columns, and a clue area 102b having displayed thereon numerical clues for respective rows. The numerical clue is the number of contiguous cells to be filled in black (hereinafter referred to as "black cell(s)"). For example, if the numerical clue is 5, five contiguous cells are to be black cells. Further, when there are a plurality of numerical clues assigned to a single column or a single row, each of the numerical clues represents the number of contiguous cells to be black cells, and there needs to be at least one cell, which is not filled in (hereinafter referred to as a "white cell"), between two groups of the contiguous black cells). For example, the numerical clues "2" "1" indicates that two contiguous black cells and one black cell are to be arranged in order thereof. A player uses the numerical clues displayed on an upper portion and a left portion as clues, and determines cells to be black cells. The player then performs an operation so as to fill in the cells appropriately. In the present embodiment, each time the player touches a desired cell with the stylus pen 17 or the player's finger, a display state of the cell is switched from the white cell to the black cell and vice versa.

As shown in FIG. 4, there are two types of the numerical clues displayed in the clue area 102, that is, a normal numerical clue 105 and a large numerical clue 106. The normal numerical clue 105 is displayed so as to be accommodated within an area having a size corresponding to one cell in the solution area 101. On the other hand, the large numerical clue 106 is displayed in an area having a size corresponding to two or more cells in the solution area 101. The normal numerical clue 105 represents the number of contiguous black cells to be arranged in a predetermined row or column. On the other hand, the large numerical clue 106 represents the number of contiguous black cells to be arranged in two or more neighboring columns or rows to which the large numerical clue is assigned and displayed.

Figure 5:
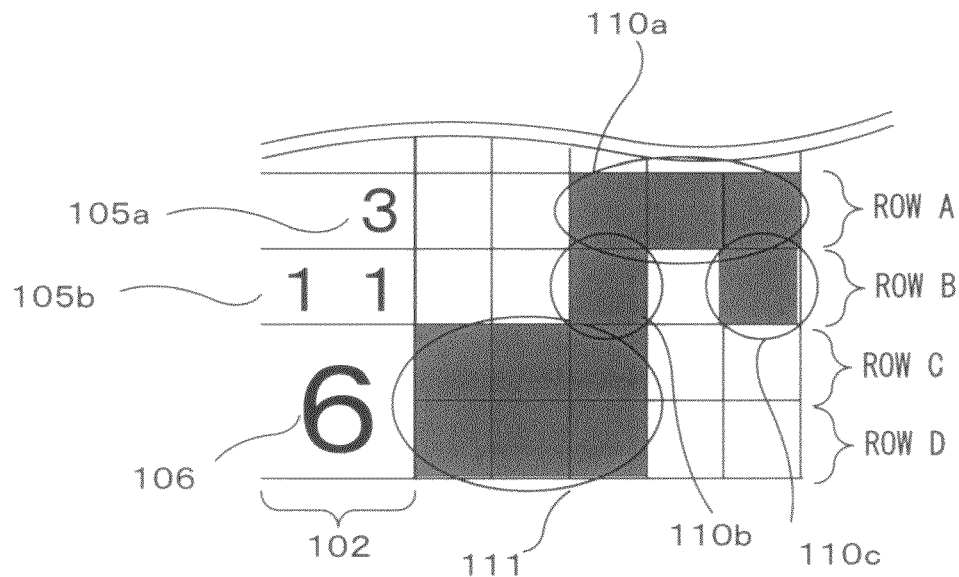
FIG. 5 is another exemplary game screen assumed in the present embodiment.

With reference to FIG. 5, the normal numerical clue 105 and the large numerical clue 106 will be described. FIG. 5 is exemplified by a case where there are four rows including a row A, a row B, a row C, and a row D. The normal numerical clues are used for the row A and the row B, and the large numerical clues are used for the row C and the row D. For the sake of a simple explanation, only the row (horizontal) direction will be illustrated, however, a similar concept may be applied to the column (vertical) direction.

First, as shown in FIG. 5, when the numerical clue is displayed with respect to black cells in the row A, a value "3", which is the number of the black cells in the row A, is displayed as a normal numerical clue 105a for the row A. In a similar manner, with respect to black cells in the row B, the numerical clue is displayed as a normal numerical clue 105b. As shown in FIG. 5, in the row B, two black cells are arranged having a white cell sandwiched therebetween. Therefore, two numerical clues "1" and "1" are displayed as the normal numerical clues 105b.

On the other hand, in the row C and the row D, three black cells are assigned contiguously in two rows. When the numerical clue corresponding to these black cells is displayed in the clue area 102 as the large numerical clue 106 in a manner ranging over the row C and the row D, a value "6" is the numerical clue indicative of the number of contiguous black cells arranged over the two rows of the row C and the row D. The value "6" is displayed in the clue area 102, in a manner ranging over the row C and the row D, and a font-size thereof is greater than that of the normal numerical clue 105.

Figure 6:
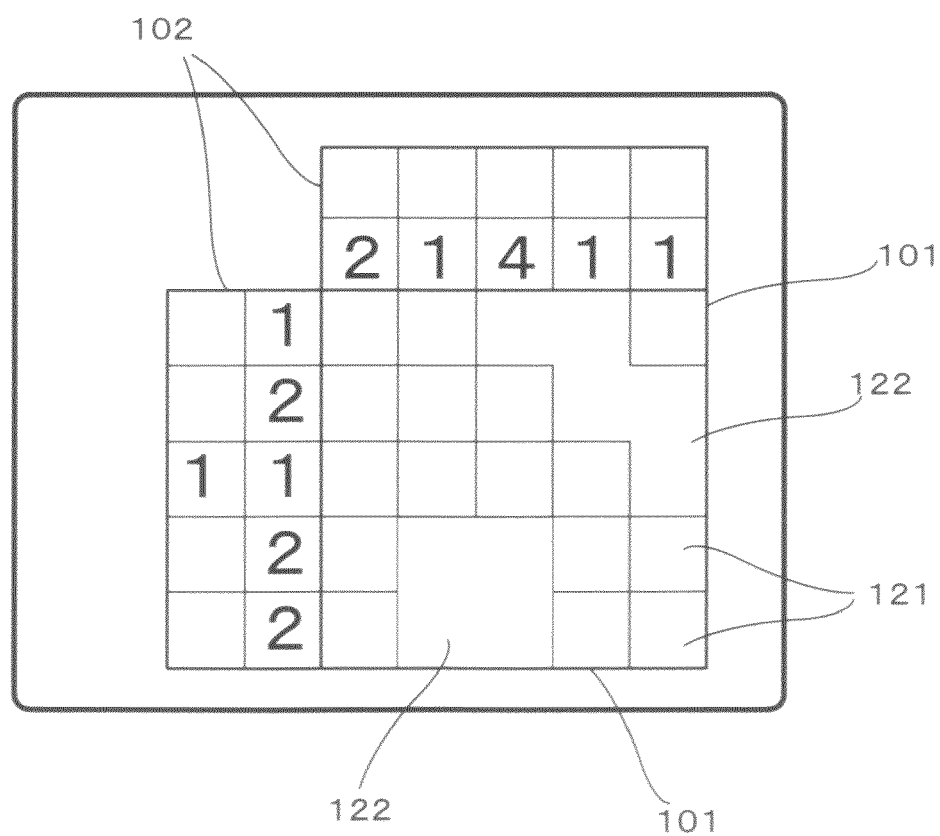
FIG. 6 is another exemplary game screen assumed in the present embodiment.
Figure 7:
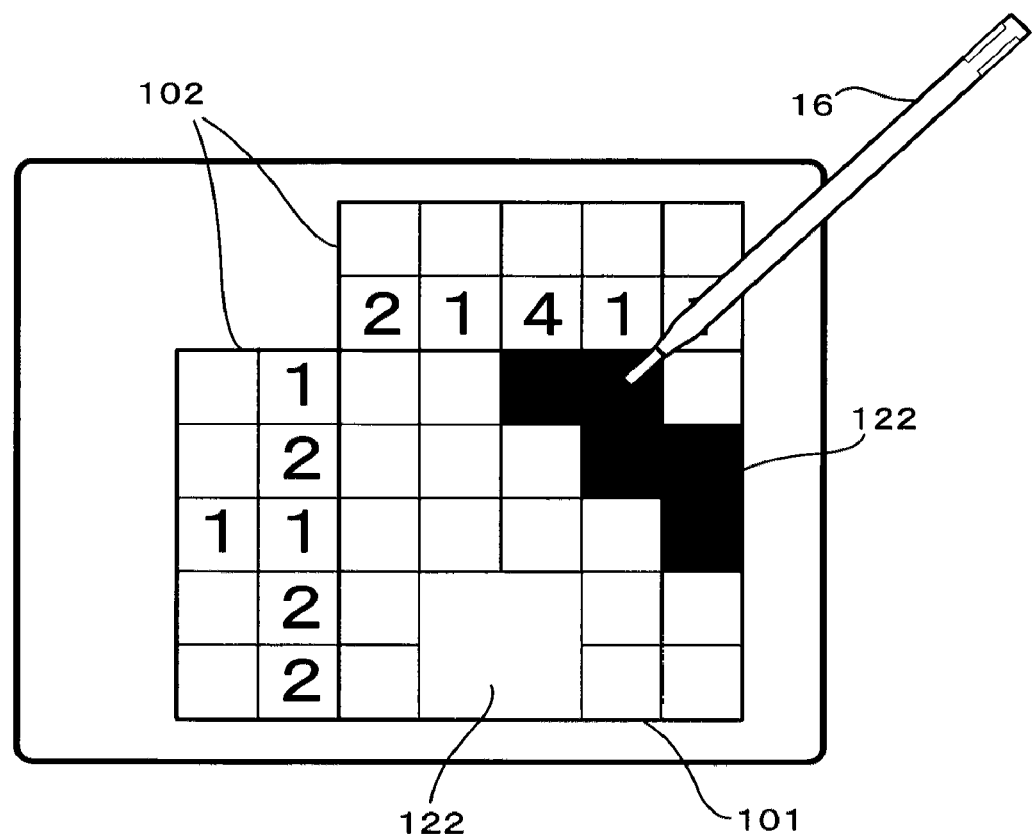
FIG. 7 is another exemplary game screen assumed in the present embodiment.

Next, another exemplary game screen in the present embodiment will be described. FIG. 6 shows another exemplary game screen assumed in the present embodiment. The screen shown in FIG. 6 also has the solution area 101 and the clue area 102 displayed thereon, in the same manner as the screen shown in FIG. 4. In above-described FIG. 4, two types of numerical clues are displayed in the clue area. On the other hand, the game screen shown in FIG. 6 has two types of cells displayed in the solution area 101. That is, in addition to a normal cell 121 having a size corresponding to one cell, a connective cell 122 having size corresponding to a plurality of cells which are connected together to be one big cell, are displayed.

As shown in FIG. 6, the connective cell 122 is regarded as one big cell formed of any contiguous cells, selected from specific cells designated by the question maker within a scope of a fixed rule. In the present embodiment, the fixed rule is defined as follows: any column or row has only one area constituted of a connective cell. When the connective cell 122 is touched, all the cells constituting the connective cell 122 are filled in black simultaneously (see FIG. 7). When the cells are already filled in black, the cells are returned to the white cells. That is, with respect to the cells constituting the connective cell, processing of filling-in and returning to the white cells is performed simultaneously.

Figure 8:
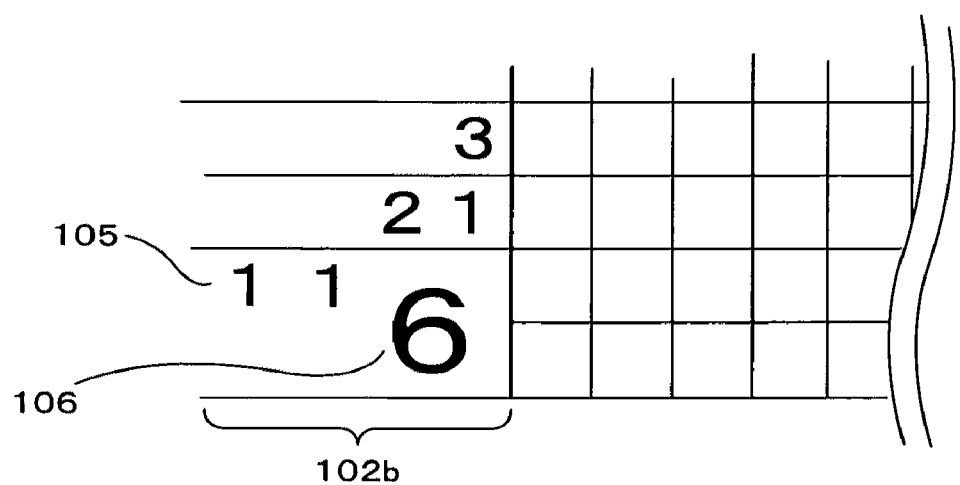
FIG. 8 is another exemplary game screen assumed in the present embodiment.

In the above description, for the sake of convenience, the large numerical clue and the connective cell are described by using different exemplary screens. However, the large numerical clue and the connective cell may be used in one puzzle question in a combined manner, or only either of the large numerical clue or the connective cell may be used. Further, as shown in FIG. 8, both the large numerical clue and the normal numerical clue may be assigned to a common column or a common row in a mixed manner. In this manner, the picture crossword puzzle game is executed by using the large numerical clue and the connective cell, whereby a novel entertainment can be provided to a player who are not satisfied with the conventional picture crossword puzzles.

First Embodiment

Figure 9:
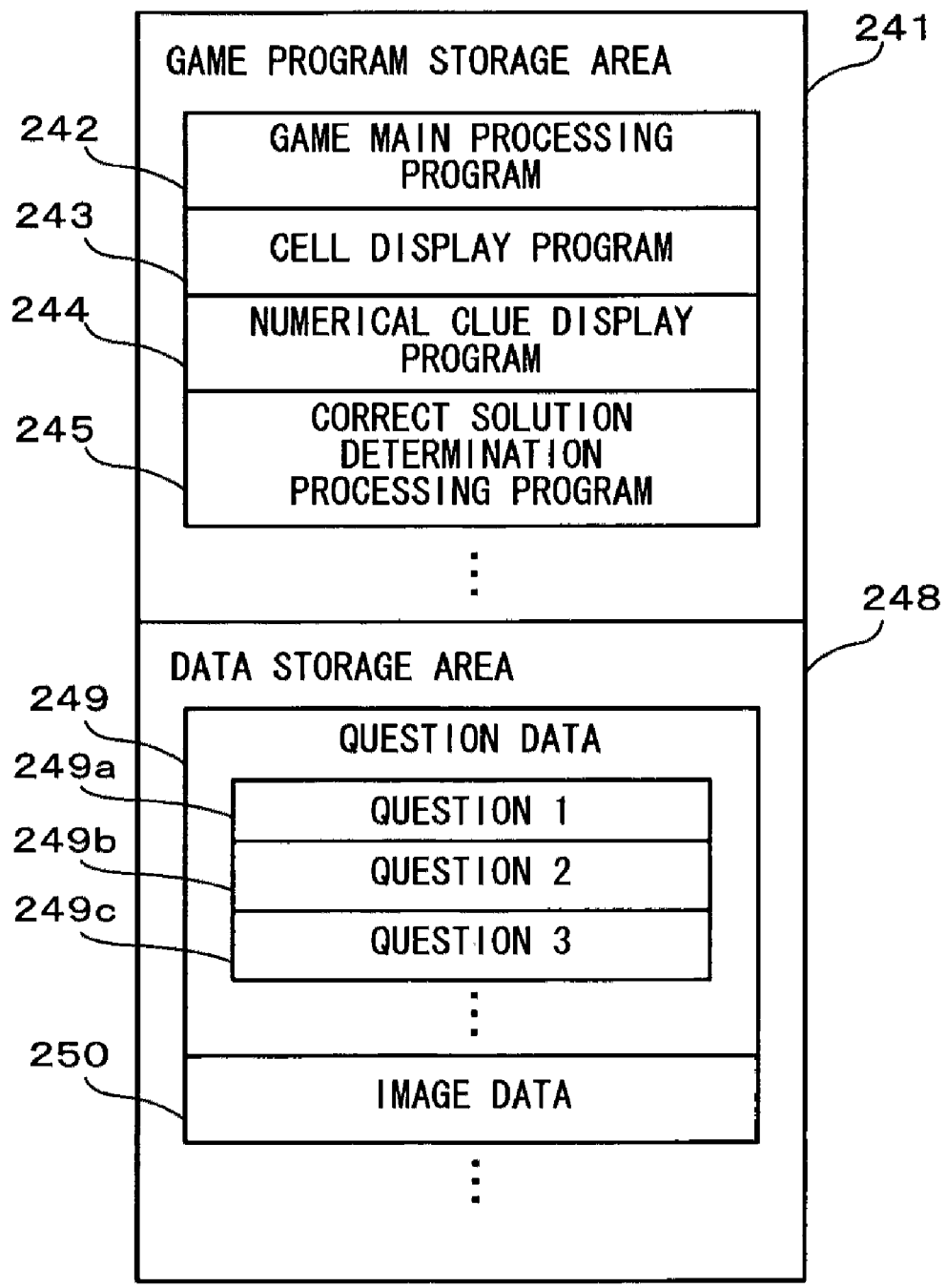
FIG. 9 is a memory map graphically showing a memory space of a RAM 24 shown in FIG. 3.

Next, a puzzle game process according to a first embodiment of the present invention will be described. First, data stored in the RAM 24 at the time of the puzzle game process will be described. FIG. 9 is a diagram showing a memory map of the RAM 24 provided to the game apparatus 10. As shown in FIG. 9, the RAM 24 includes a game program storage area 241 and a data storage area 248. Data in the game program storage area 241 and in the data storage area 248 are stored in the memory card 17, and are transferred and stored in the RAM 24 when the game program is executed.

In the game program storage area 241, a game program executed by the CPU core 21 is stored. The game program is constituted of a game main processing program 242, a cell display program 243, a numerical clue display program 244, a correct solution determination processing program 245, and the like.

Figure 13:
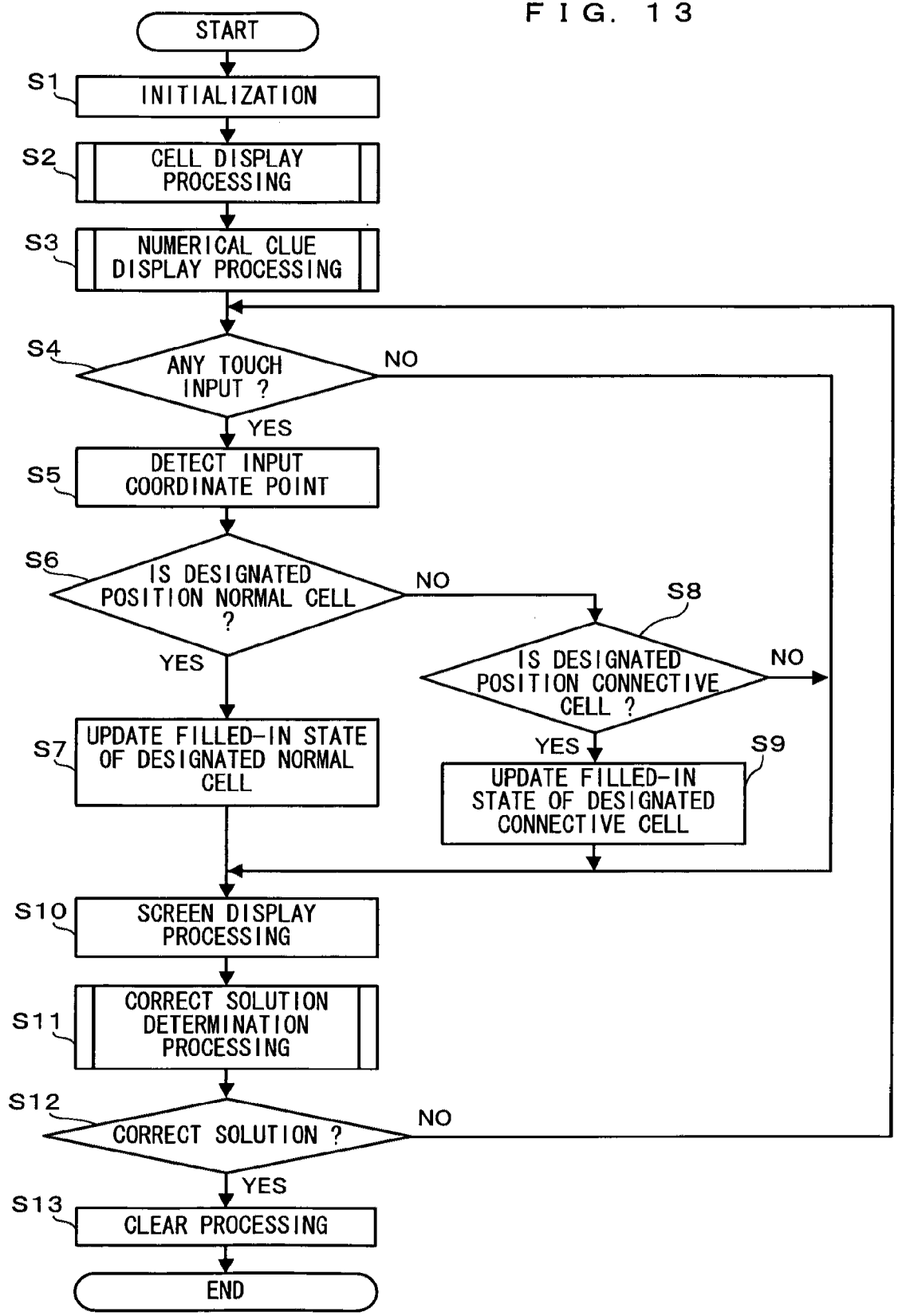
FIG. 13 is a flowchart showing a flow of a game process executed in a game apparatus 10.

The game main processing program 242 is a program corresponding to processing in a flow chart shown in FIG. 13 described below. The cell display program 243 is a program for causing the CPU core 21 to execute a process for displaying the above-described normal cell 121 and the connective cell 122 in the solution area 101 shown in above-described FIGS. 4 and 7. The numerical clue display program 244 is a program for causing the CPU core 21 to execute a process for displaying the normal numerical clue 105 and the large numerical clue 106 in the clue area 102 shown in FIG. 4 and the like. Further, the correct solution determination processing program 245 is a program for causing the CPU core 21 to execute a process for determining whether or not the puzzle (question) displayed on the screen has been cleared.

In the data storage area 248, not only data such as question data 249 and image data 250, but also various variables and flags which are both used in a game process are stored.

Figure 10:
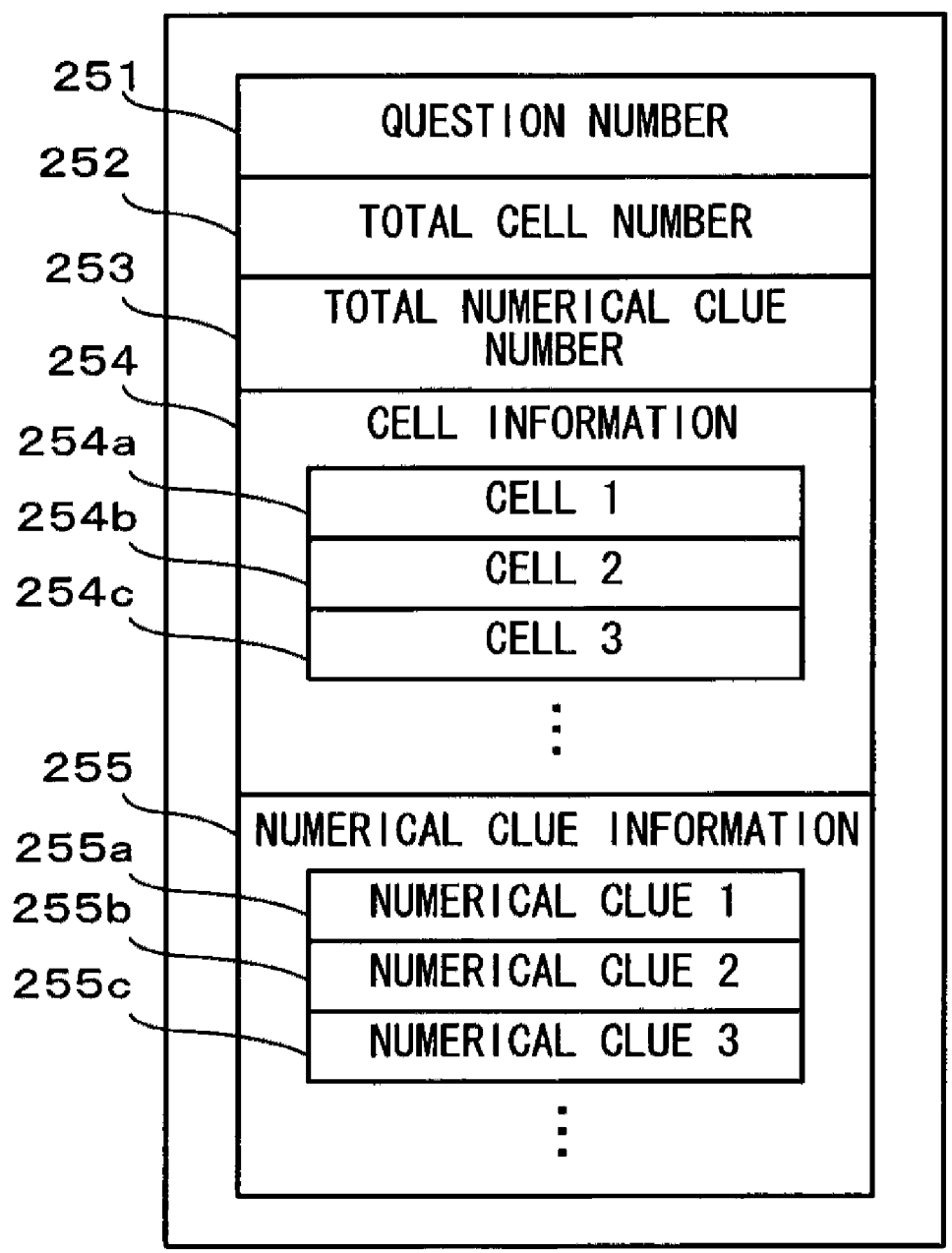

The question data 249 is data on puzzle questions provided to a player, and stored on a question-by-question basis (question 1, question 2, question 3, . . . ). FIG. 10 is a diagram showing an exemplary data structure of question data for one question (a question data 249a, as an example). As shown in FIG. 10, the question data 249a is constituted of a question number 251, a total cell number 252, a total numerical clue number 253, cell information 254, and numerical clue information 255. The question number 251 is the number to uniquely identify a question. In the present embodiment, as the question number 251, the number is assigned respective questions consecutively from 1. Further, a question having the question number 251 "1" is hereinafter simply referred to as "question 1". The total cell number 252 represents the number of cells constituting a question. In accordance with above-described FIG. 4, the solution area 101 has 10 columns×10 rows=100 cells, and thus the total cell number 252 is "100". The total numerical clue number 253 represents the number of the numerical clues constituting a question. In accordance with FIG. 4, there are 32 numerical clues, and thus the total numerical clue number 253 is "32".

Figure 11:
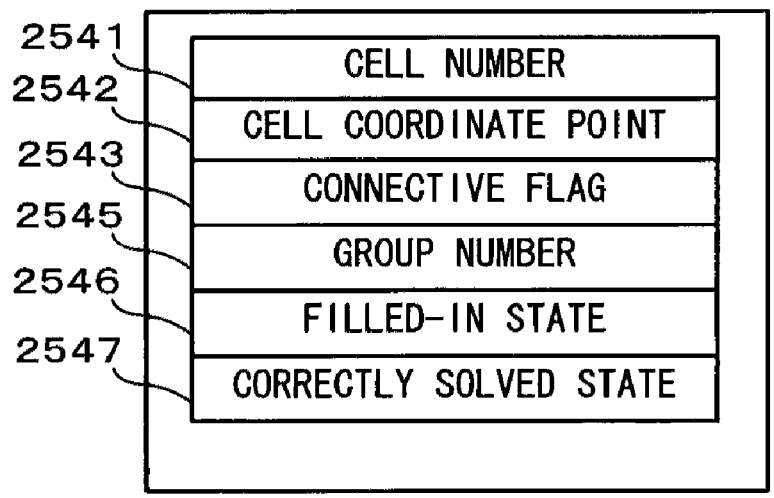

The cell information 254 is information relating to respective cells displayed in the solution area 101, and divided and stored on a cell-by-cell basis. FIG. 11 is a diagram showing an exemplary data structure of the cell information 254a of one cell. The cell information 254a is constituted of a cell number 2541, a cell coordinate point 2542, a connective flag 2543, a group number 2545, a filled-in state 2546, and a correctly solved state 2547.

The cell number 2541 is a number to uniquely identify a cell. In the present embodiment, as the cell number 2541, the number is assigned to respective cells consecutively from "1". Further, for example, a cell having the cell number 2541 "1" is hereinafter simply referred to as "cell 1". The cell coordinate point 2542 is information showing a position of a cell displayed in the screen. The connective flag 2543 is a flag showing whether or not a cell forms a part of a connective cell as above described. When the connective flag 2543 is set to on, it is indicated that the cell is connected to other cells so as to form the connective cell. When the connective flag 2543 is set to off, it is indicated that the cell is a normal cell.

The group number 2545 is the number to identify, when there is a plurality of connective cells assigned in the solution area 101, the respective connective cells. Therefore, a common group number 2545 is assigned to respective cells constituting one connective cell.

The filled-in state 2546 is information indicating whether or not a cell is filled in. In the present embodiment, either of two states, i.e., a state of a "black cell" in which a cell is filled in black, or a state of a "white cell" in which a cell is not filled in, is set.

The correctly solved state 2547 is information indicating a filled-in state of a cell for a correct solution. When the correctly solved state 2547 of a cell is set to the "black cell", a state of being filled in black is a correct solution for the cell. When the correctly solved state 2547 of a cell is set to the "white cell", a state of not being filled in is a correct solution for the cell.

Figure 12:
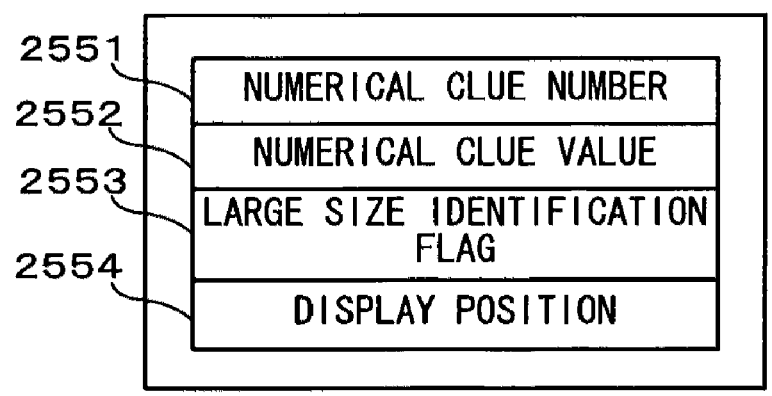

With reference back to FIG. 10, the numerical clue information 255 is information about the numerical clue displayed in the clue area 102, and divided and stored by respective numerical clues. FIG. 12 is a diagram showing an exemplary data structure of a numerical clue 255a. As shown in FIG. 12, the numerical clue 255a is constituted of a numerical clue number 2551, a numerical clue value 2552, a large size identification flag 2553, and a display position 2554.

The numerical clue number 2551 is the number to uniquely identify respective numerical clues. In the present embodiment, the number is assigned to respective numerical clues as the numerical clue number 2551 consecutively from "1". For example, a numerical clue having the numerical clue number 2551 "1" is hereinafter simply referred to as "numerical clue 1".

The numerical clue value 2552 is a specific numerical value represented by a numerical clue. The large size identification flag 2553 is a flag to identify whether a numerical clue is the large numerical clue or the normal numerical clue. When the large size identification flag 2553 of a numerical clue is set to on, it is indicated that the numerical clue is the large numerical clue, whereas when the large size identification flag 2553 of a numerical clue is set to off, it is indicated that the numerical clue is the normal numerical clue. The display position 2554 is information indicating a position of a numerical clue displayed in the screen.

Next, a flow of a game process executed in the game apparatus 10 will be described with reference to FIGS. 13 to 18. FIG. 13 is a flowchart showing the flow of the game process executed in the game apparatus 10. When the power is applied to the game apparatus 10, the CPU core 21 of the game apparatus 10 executes a boot-up program which is stored in a boot ROM (not shown), and respective units including the RAM 24 and the like are initialized. The game program stored in the memory card 17 is read into the RAM 24, and execution of the game program is started. As a result, a game image is displayed on the second LCD 12 via the second GPU 27, and a game starts. The flow chart shown in FIG. 13 shows a game process from displaying to clearing of one question. Further, a processing loop from step S4 to step S12 shown in FIG. 13 are executed repeatedly on a frame-by-frame basis.

First, in step S1, a process of initializing data, which is used in subsequent processes, is executed. Specifically, the CPU core 21 randomly selects one question to be provided from the question data 249. Further, the CPU core 21 performs initialization of various flags and the like.

Figure 14:
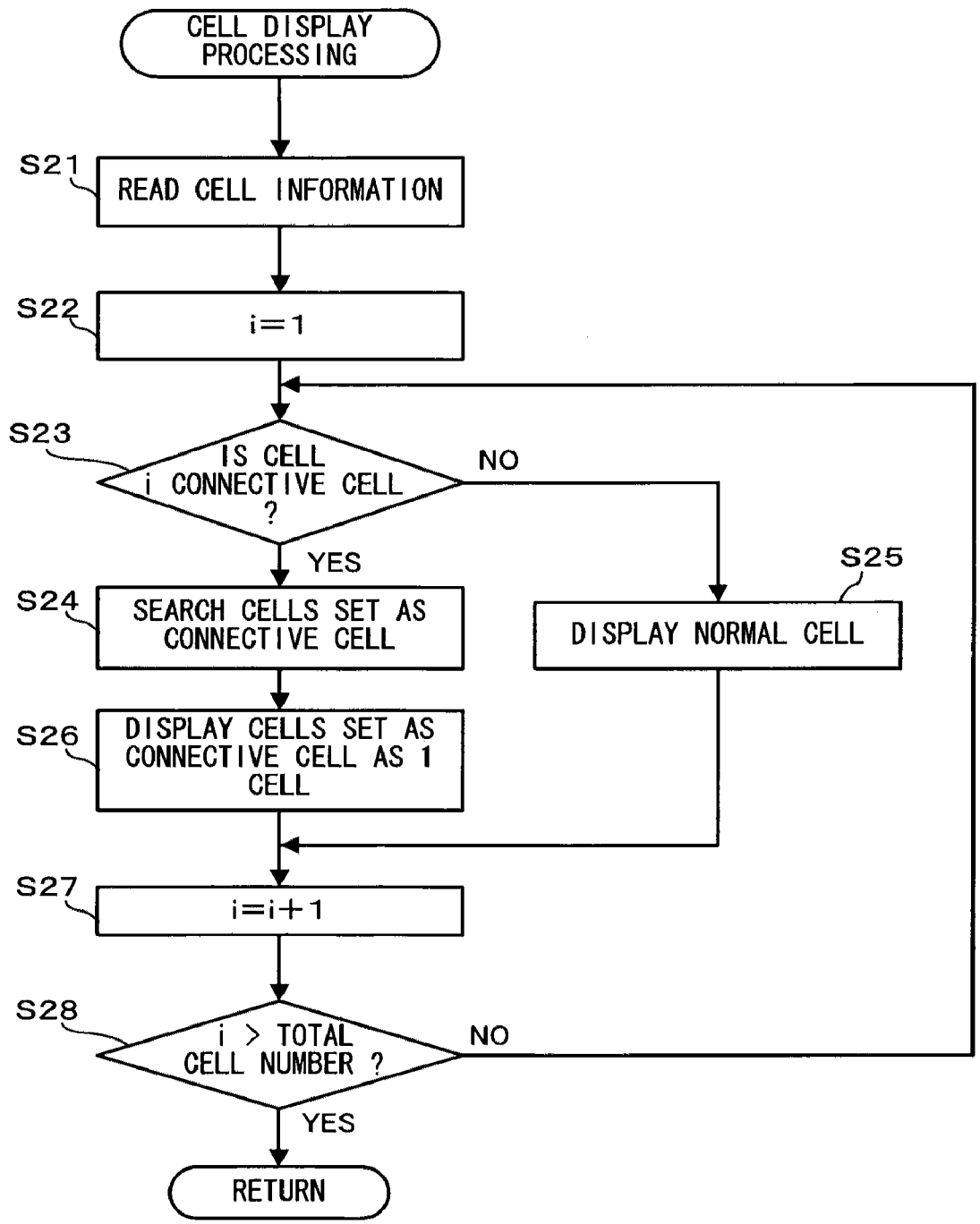
FIG. 14 is a flow chart showing, in detail, cell display processing illustrated in step S2 shown in FIG. 13.

Next, in step S2, cell display processing is performed so as to display the cells in the solution area 101. FIG. 14 is a flow chart showing, in detail, the cell display processing illustrated in above-described step S2. As shown in FIG. 14, the cell information 254 relating to the question selected in above-described step S1 is read from the RAM 24 in step S21. Next, in step S22, 1 is set to a variable i indicative of the cell number 2541. In subsequent step S23, data on a cell i is read from the cell information 254. The CPU core 21 then determines whether or not a value of the connective flag 2543 indicates an "on" state, that is, whether or not the cell i is the connective cell.

As a result of the determination in step S23, when the cell i is determined to be the connective cell (YES in step S23), a cell connected to the cell i is searched. The processing of this step S24 will be described specifically. The CPU core 21 first reads the group number 2545 of the cell i. The CPU core 21 subsequently searches, from the cell information 254, data on a cell having the same group number 2545 as the read group number 2545. The CPU core 21 then temporarily stores the searched cell and the cell number 2541 thereof in the RAM 24.

Figure 15:
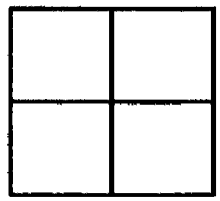
FIG. 15 is a diagram showing an exemplary connective cell.
Figure 16:
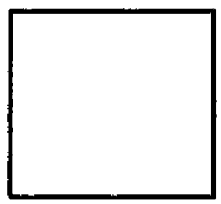
FIG. 16 is a diagram showing an exemplary connective cell whose closing lines located there inside have been deleted.

Next, in step S26, performed is a process of displaying cells, which constitute one connective cell, i.e., the cell searched in step S24 and the cell i being processed in a current processing loop, as one cell. The process is performed so as to show the player that these cells are connected together. Specifically, with respect to each of the connected cells constituting a part of the connective cell, the cell coordinate point 2542 of each of the cells is searched and obtained in accordance with the cell number 2541 stored in the above-described RAM 24. Next, image data, in which each of the cells is allocated to a position in the solution area as indicated by the cell coordinate point 2542 corresponding to each of the cells, is generated in a frame buffer which is formed in a part of the second VRAM 29. Subsequently, a process of deleting closing lines, which divides off the cells, is performed. For example, as shown in FIG. 15, when 2×2 (i.e. 4) cells forms a connective cell, the closing lines inside thereof are deleted, and image data having only an outer frame displayed is generated, as shown in FIG. 16. That is, image data, in which four cells are connected together and displayed as one cell, is generated. Thereafter, the processing proceeds to step S27 described below.

On the other hand, when the cell i is determined not to be a connective cell in above-described step S23 (NO in step S23), a process for displaying the cell i as the normal cell is performed in step S25. Specifically, image data, in which the cell i is allocated to a position in the solution area as indicated by the cell coordinate point 2542 of the cell i, is generated in the above-described frame buffer. Thereafter, the processing proceeds to next step S27.

Next, a process of adding 1 to the variable i is executed in step S27. In subsequent step S28, whether or not the value of the variable i is greater than the value of the total cell number 252 constituting the question selected in step S1 is determined. That is, whether or not all the cells constituting the question have been processed is determined. When the value of the variable i is not greater than the value of the total cell number 252 (NO in step S28), the processing returns to step S23 and is repeated since there remain cells yet to be processed. When the value of the variable i is determined to be greater than the value of the total cell number 252 (YES in step S28), the cell display processing ends since a process of displaying all the cells has been ended.

Figure 17:
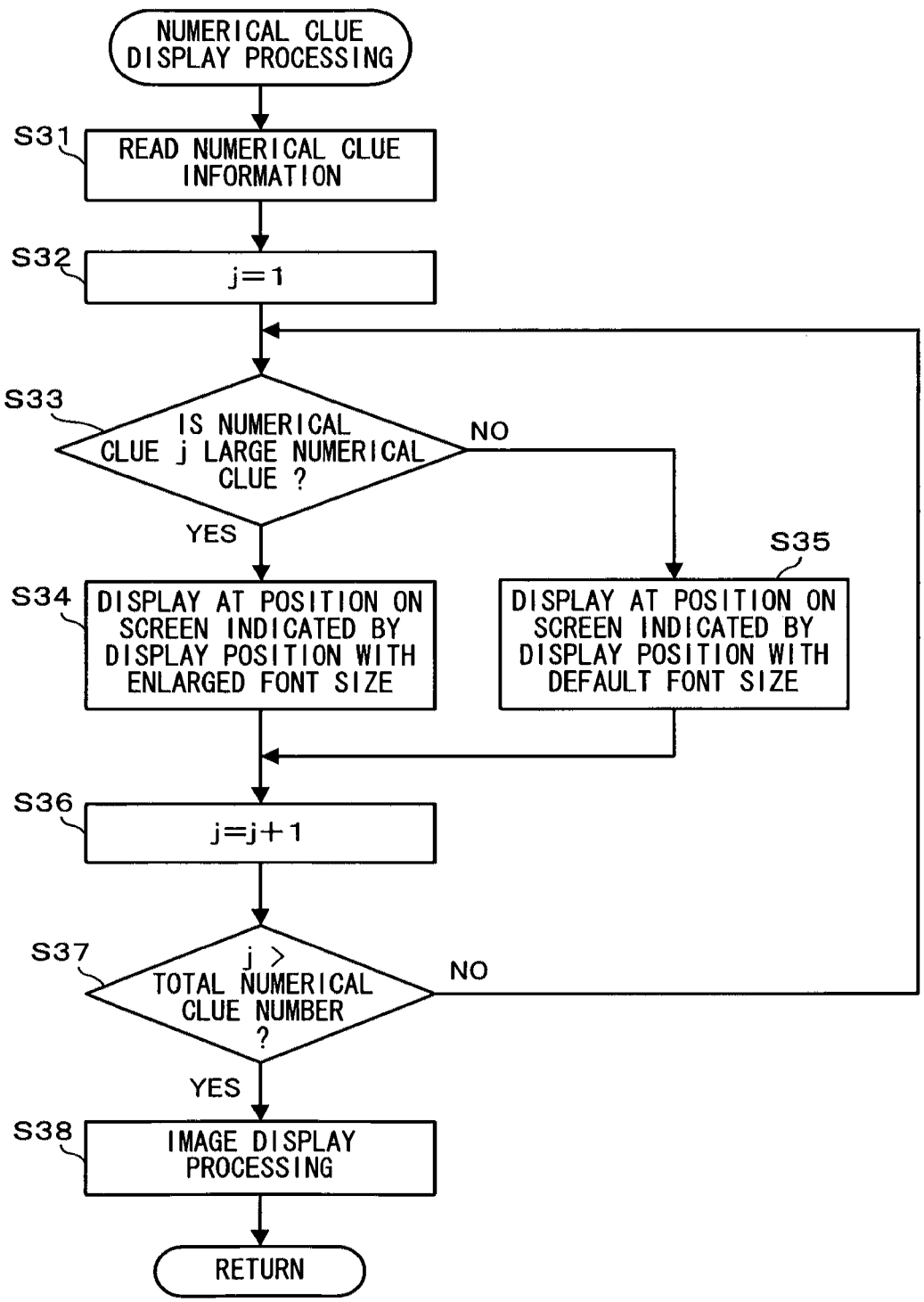
FIG. 17 is a flow chart showing, in detail, numerical clue display processing illustrated in step S3 shown in FIG. 13.

With reference back to FIG. 13, subsequent to the cell display processing in step S2, numerical clue display processing is executed in step S3. In the processing, image data in which numerical clues are allocated in the clue area 102 is generated in the above-described frame buffer. FIG. 17 is a flow chart showing, in detail, the numerical clue display processing illustrated in above-described step S3. As shown in FIG. 17, the numerical clue information 255 about the question selected in above-described step S1 is read from the RAM 24 in step S31.

Next, in step S32, 1 is set to a variable j indicative of the numerical clue number 2551. In subsequent step S33, data on a numerical clue j is read from the numerical clue information 255. Whether or not a value of the large size identification flag 2553 of the read numerical clue j indicates an "on" state, that is, whether or not the numerical clue j is the large numerical clue is determined.

As a result of the determination in step S33, when the numerical clue j is determined to be the large numerical clue (YES in step S33), the font size of the numerical clue is enlarged to a predetermined size in step S34. Image data, in which the enlarged numerical clue is allocated to a display position in the clue area 102 as indicated by the display position 2554, is then generated in the above-described frame buffer. The processing then proceeds to step 36 described below.

On the other hand, as a result of the determination in step S33, when the numerical clue j is determined not to be the large numerical clue (NO in step S33), a process for displaying the numerical clue j as the normal numerical clue is performed in step S35. Specifically, the image data, in which the numerical clue j is allocated to a position in the clue area 102 as indicated by the display position 2554 of the numerical clue j, is generated in the above-described frame buffer. Further, the font size of the numerical clue remains as an initial value previously set, and is not changed. The processing then proceeds to subsequent step S36.

Next, in step 36, a process of adding 1 to the variable j is performed. In subsequent step S37, whether or not a value of the variable j is greater than the value of the total numerical clue number 253 of the question selected in step S1 is determined. That is, whether or not a process of displaying all the numerical clues to be used for the question has been completed is determined. When the value of the variable j is not greater than the value of the total numerical clue number 253 (NO in step S37), the processing is repeated after returning to step S33, and since there remain numerical clues yet to be subject to the display processing. When the value of the variable j is determined to be greater than the value of the total numerical clue number 253 (YES in step S37), the process of displaying all the numerical clues is completed. Accordingly, a process for displaying, in the screen, a game image based on the image data stored in the frame buffer is performed in subsequent step S38. Here ends the numerical clue display processing.

With reference back to FIG. 13, subsequent to the processing in step S3, whether or not a player has performed touch input in step S4 is determined. When the touch input by the player is not detected (NO in step S4), the processing proceeds to step S10 described below. When the touch input is detected (YES in step S4), an input coordinate point inputted by the touch input is detected in subsequent step S5.

In subsequent step S6, whether or not the detected input coordinate point, that is, a position on the screen indicated by the player, corresponds to a position at which a normal cell is displayed is determined. Specifically, the CPU core 21 extracts, from the cell information 254, cell information about the connective flag which is off, that is, data on the normal cells only. Next, the CPU core 21 determines, based on the input coordinate point detected in step S6 and the cell coordinate point 2542 of each of the extracted normal cells, whether or not a normal cell display position has been touched. When the normal cell display position is determined to have been touched, the filled-in state 2546 of the touched normal cell is updated in step S7. Specifically, the CPU core 21 updates the filled-in state 2546 from "white cell" to "black cell", or from "black cell" to "white cell". Further, the image data stored in the frame buffer is also updated such that a cell corresponding to the touched normal cell is switched to black or white accordingly.

On the other hand, when the normal cell is determined not to have been touched as a result of the determination in step S6 (No in step S6), whether or not a position (the touched position) on the screen indicated by the player is a connective cell display position is determined in step S8. Specifically, the CPU core 21 extracts, from the cell information 254, cell information about the connective flag which is on, that is, data on the connective cells only. Next, the CPU core 21 determines, based on the detected input coordinate point and the cell coordinate point 2542 of each of the cells constituting the extracted connective cells, whether or not any of the cells forming a part of a connective cell is touched. As a result, when any of the cells forming the part of the connective cell is determined to have been touched, the filled-in state 2546 of each of the cells forming the part of the connective cell is updated in step S9. Specifically, the group number 2545 of the touched cell is obtained. Next, based on this, cell information of other cells forming the remaining part of the connective cell than the touched cell is searched and extracted. The filled-in state 2546 of each of the other cells is then updated uniformly. For example, when the filled-in state 2546 before the touch is the "white cell", the filled-in state 2546 of each of the cells forming the part of the connective cell is updated to the "black cell". In a similar manner, when the filled-in state 2546 before the touch is the "black cell", each of the cells forming the part of the connective cell is updated to the "white cell". At the same time, the image data stored in the frame buffer is also updated such that a connective cell corresponding to the connective cell having the touched cell included therein is switched to black or white accordingly.

Next, in step S10, a process of displaying a screen is performed. That is, a process of displaying, on the LCD 12, a game image based on the image data stored in the frame buffer is performed.

Figure 18:
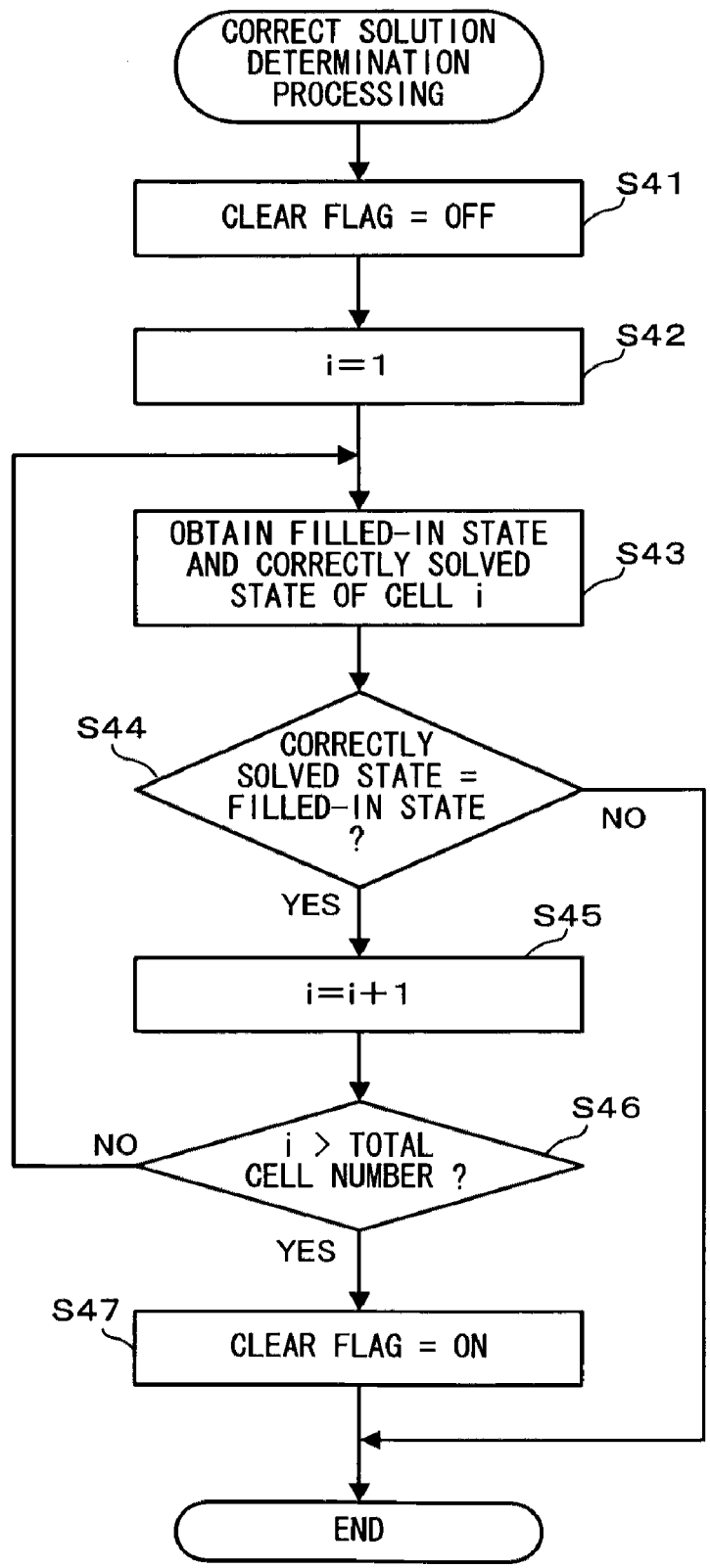
FIG. 18 is a flow chart showing, in detail, correct solution determination processing illustrated in step S11 shown in FIG. 13.

Next, in step S11, correct solution determination processing to determine whether or not a question having been provided is solved is performed. FIG. 18 is a flow chart showing, in detail, the correct solution determination processing illustrated in above-described step S11. As shown in FIG. 18, in step S41, a clear flag, which indicates that the provided question has been cleared, is set to off. Next, in step S42, 1 is set to the variable i. In subsequent step S43, the filled-in state 2546 and the correctly solved state 2547 of the cell i are obtained.

Next, in step S44, whether or not the correctly solved state 2547 and the filled-in state 2546, both having been obtained in step S43, correspond to each other is determined. That is, whether or not the filled-in state of the cell i is correct is determined. As a result of the determination, when the correctly solved state 2547 does not correspond to the filled-in state 2546 (NO in step S44), the cell i is in an erroneous state. In this case, the correct solution determination processing ends as it is. That is, when any one erroneously solved cell is found, the correct solution determination processing ends.

On the other hand, as a result of the determination in above-described step S44, when the correctly solved state 2547 corresponds to the filled-in state 2546 (YES in step S44), the cell i is correct. In this case, in subsequent step S45, "1" is added to the variable i. That is, preparation for checking the subsequent cell is performed.

Next, in step S46, whether or not the variable i is greater than the total cell number 252 is determined. When the variable i is determined to be greater (YES in step S46), all the cells have been checked without having erroneously solved cells. Accordingly, it is considered that the question has been cleared. Therefore, the clear flag is set to on in step S47, and the correct solution determination processing ends.

With reference back to FIG. 13, next to step S11, whether or not the clear flag is on is determined in step S12. That is, whether or not the provided question has been cleared is determined. As a result, when it is determined that the question has yet to be cleared, the processing returns to step S4, and, the game process is repeated. On the other hand, when is it determined that the question has been cleared, clearing processing is performed in step S13. Specifically, cleared image display processing, point adding processing, or the like is performed. Here ends the game process according to the first embodiment.

As above described, in the present embodiment, the number of black cells which are contiguously arranged and range over two rows or two columns is displayed as the large numerical clue in the clue area 102. Accordingly, a level of difficulty of the picture crossword puzzle game is increased, and thus a novel entertainment can be provided to those players who get bored with the conventional picture crossword puzzle games. Further, the connective cell which is defined by connecting a plurality of cells is also used in the solution area. Accordingly, the level of difficulty of the game can be increased or decreased. By increasing the level of difficulty, a novel entertainment can be provided to the players who get bored with the conventional picture crossword puzzle games. Also, by decreasing the level of difficulty, a novel manner of enjoyment can be provided to those players who feel that the conventional picture crossword puzzle games are difficult.

Regarding the above-described connective cell, a display form of the connective cell is not limited to such a form in which the closing lines are deleted as above described as long as the display form clearly indicates that cells are connected to one another. For example, respective cells which are connected to one another may be displayed in a predetermined color (e.g., in red). Further, in the above-described embodiment, although neighboring cells form the connective cell, a cell 131 and a cell 132, which are distantly-positioned as shown in FIG. 19, for example, may form the connective cell. In this case, when either of the cell 131 or the cell 132 is filled in black, the other is also filled in black simultaneously. In a similar manner, in the case of switching back from the black cell to the white cell, when one of the cells is switched back to white cell, the other cell is also switched back to the white cell, simultaneously.

Further, in the above-described embodiment, as a state of the cell (filling-in color), the "black cell", i.e., a case of filling in black, and the "white cell", i.e., a case of not filling in are used to illustrate the picture crossword puzzle. The present invention is also applicable to such a picture crossword puzzle that has further increased number of types of colors to be filled in the cells (generally referred to as a color logic). Further, in the above-described embodiment, a method for marking (checking) a touched cell is exemplified by filling in the cells (updating the filled-in state), but is not limited thereto. For example, as a method for marking the touched cell, the cell may have (or remove) "o" mark added thereon, or the cell may have a character such as symbols added thereon.

Second Embodiment

Next, with reference to FIGS. 20 to 38, a second embodiment of the present invention will be described. In the first embodiment, the numerical clues are data which is previously set, stored in the memory card 17, and read therefrom (copied to the RAM 24). On the other hand, in the second embodiment, the numerical clues are generated and displayed based on correct information included in cell information.

A game apparatus according to the second embodiment of the present invention will be described. A block diagram showing a hardware configuration of the game apparatus is the same as that of the first embodiment (see FIGS. 1 to 3). However, in the present embodiment, a program partially different from that of the first embodiment is stored in the RAM 24, and when the CPU core 21 executes the program, a function different from the first embodiment is also realized.

Figure 20:
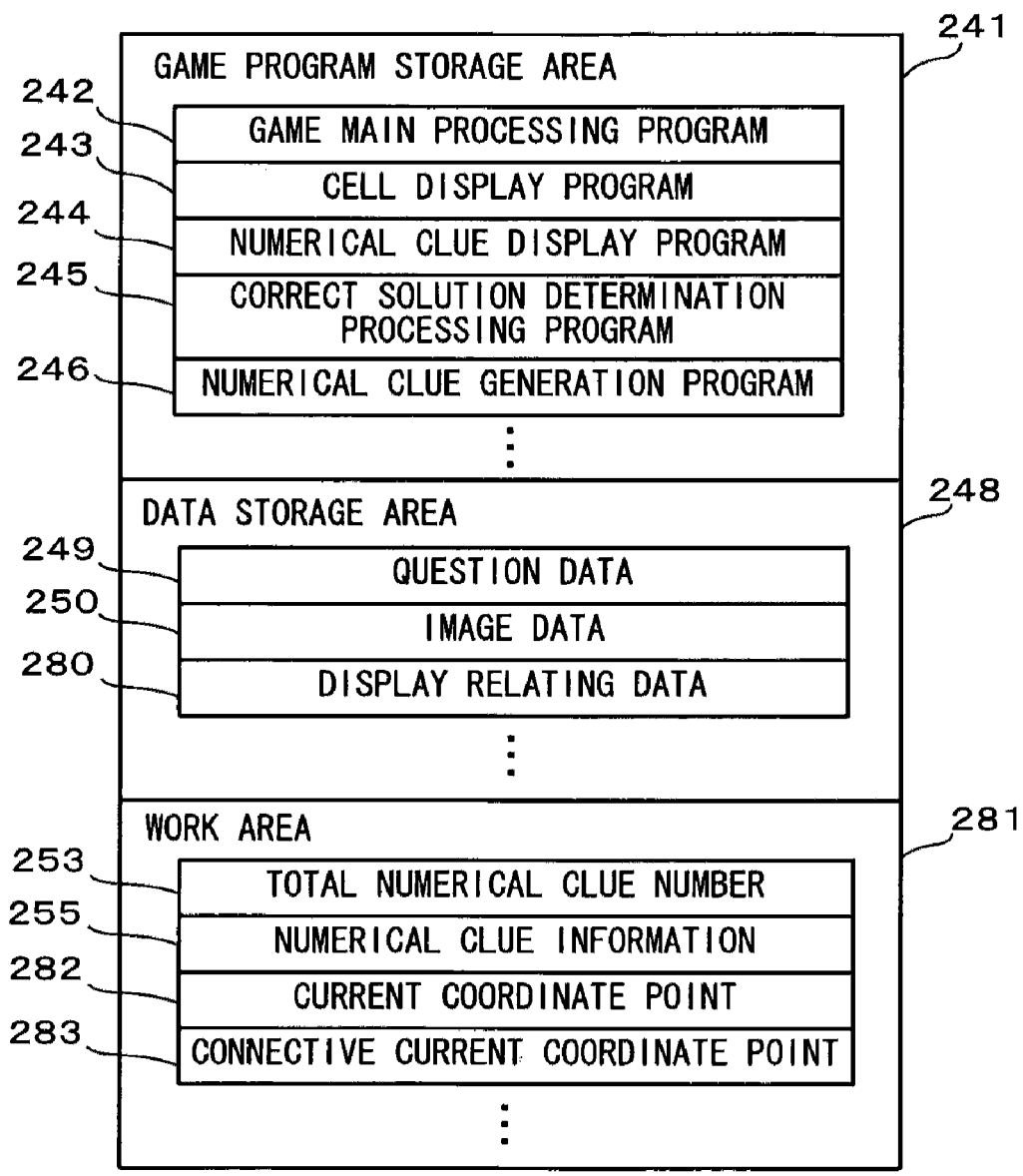
FIG. 20 is a diagram showing a memory map of a RAM 24 of a game apparatus 10 according to a second embodiment.

Data stored in the RAM 24 at the time of a game process according to the second embodiment will be described. FIG. 20 is a diagram showing a memory map of the RAM 24 provided in a game apparatus 10 according to the second embodiment. In the present embodiment, the game program storage area 241 includes the respective programs described in the first embodiment with reference to FIG. 9 and a numerical clue generation program 246. The data storage area 248 includes the respective data described in the first embodiment and display relating data 280. Further, a work area 281 is provided in the RAM 24. The work area has stored therein the total numerical clue number 253, the numerical clue information 255, a current coordinate point 282, and a connective current coordinate point 283. Here, in the first embodiment, the total numerical clue number 253 and the numerical clue information 255 are previously stored in the memory card 17, and copied into a data area in the RAM 24 at the time of the puzzle game process. On the other hand, in the second embodiment, the total numerical clue number 253 and the numerical clue information 255 are not stored in the memory card 17, but are appropriately generated in the work area 281 by the above-described numerical clue generation program 246, as a part of the puzzle game process.

The current coordinate point 282 and the connective current coordinate point 283 stored in the work area 281 are data each indicative of a position of a numerical clue to be generated in the numerical clue generation processing described below. In other words, each of the current coordinate point 282 and the connective current coordinate point 283 are data indicative of a position, either in the clue area 102*a* or in the clue area 102*b*, in which the numerical clue is to be generated. As specific data components of the current coordinate point 282 and the connective current coordinate point 283, a coordinate point (X-axis, Y-axis) is set on a screen coordinate system.

Figure 21:
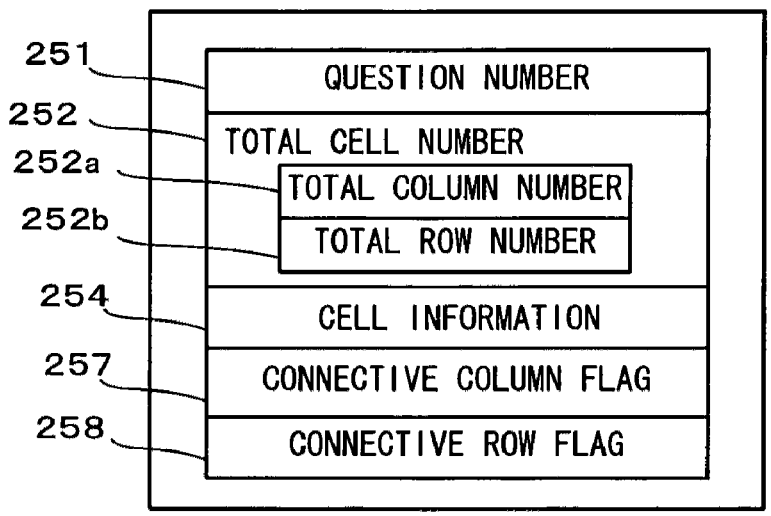
FIG. 21 is a diagram showing an exemplary data structure of question data 249a according to the second embodiment.

Further, in the second embodiment, a structure of the question data 249 is different from that of the first embodiment. FIG. 21 is a diagram showing an exemplary data structure of question data 249*a* according to the second embodiment. The question data 249*a* according to the second embodiment is equivalent to data obtained by subtracting the numerical clue information 255 from the structure of the question data according to the first embodiment and adding a column connective flag 257 and a row connective flag 258 thereto. Further, the total cell number 252 includes a total column number 252*a* indicative of the total number of the columns, and a total row number 252*b* indicative of the total number of the rows. For example, in the case where the solution area 101 of a question is constituted of 10 columns×10 rows, a value "10" is set to each of the total column number 252*a* and the total row number 252*b*.

The column connective flag 257 is a flag set for each of the columns constituting the solution area 101 of a question, and indicates whether or not at least one large numerical clue is to be displayed in the column. In other words, the flag indicates whether or not a column in the clue area corresponding to the column in the solution area is to be connected to any one column on the right side or on the left side. In the present embodiment, for the sake of a simple description, the number of columns or rows to be connected together is two, and three or more columns or rows will not be connected to one another. Further in the present embodiment, as a value of the column connective flag 257, "0" indicates that a column is not connected to another column, and "1" indicates that the column is connected to another column. In the case of a question having 10 columns, one digit is allocated to one column, and the 10 columns are indicated by using 10 digits of values, "0011001100", for example. In this example, the first digit from the left of these values of the column connective flag 257 indicates the first column, and also indicates that the first column is not connected to another column. Further, the third digit from the left indicates the third column, and also indicates that the third column is connected to another column. That is, it is indicated that the large numerical clue is displayed in the third column.

The row connective flag 258 is a flag set for each of the rows constituting the solution area 101 of a question, and indicates whether or not at least one large numerical clue is to be displayed in the row. The configuration is the same as that of the above-described column connective flag 257. In the case of a question having 10 rows, the rows are indicated by 10 digits of values.

Figure 22:
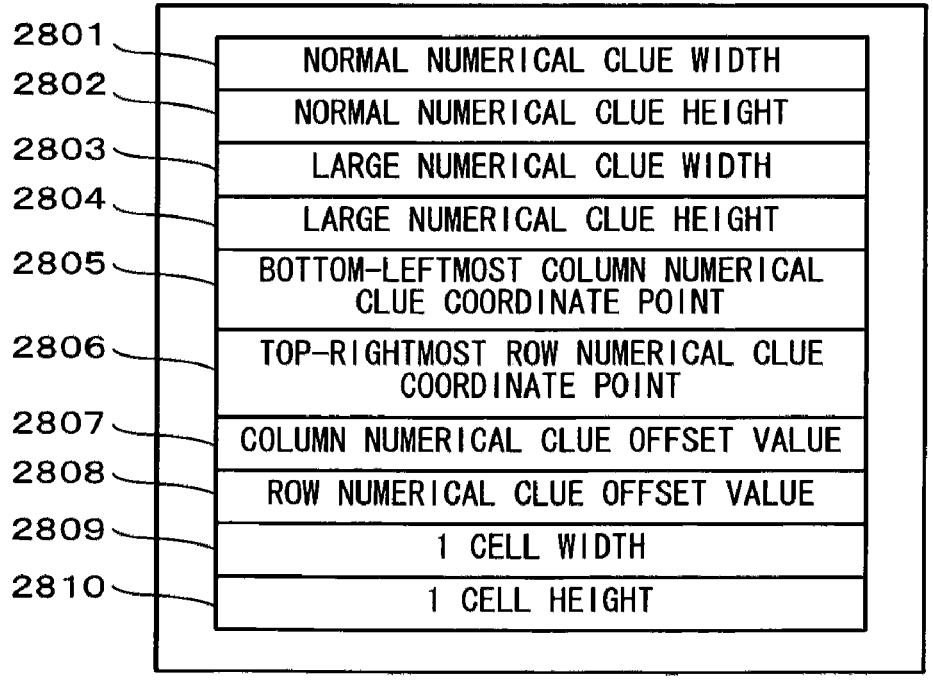
FIG. 22 is a diagram showing an exemplary data structure of display relating data 280.

FIG. 22 is a diagram showing an exemplary data structure of the display relating data 280 shown in FIG. 20. The display relating data 280 is constituted of a normal numerical clue width 2801, a normal numerical clue height 2802, a large numerical clue width 2803, a large numerical clue height 2804, a bottom-leftmost column numerical clue coordinate point 2805, a top-rightmost row numerical clue coordinate point 2806, a column numerical clue offset value 2807, a row numerical clue offset value 2808, one cell width 2809, and one cell height 2810.

In FIG. 22, the normal numerical clue width 2801 is data indicative of a width of one piece of the above-described normal numerical clues displayed in the screen. The normal numerical clue height 2802 is data indicative of a height of one piece of the normal numerical clues displayed in the screen. The large numerical clue width 2803 is data indicative of a width of one piece of the above-described large numerical clues displayed in the screen. The large numerical clue height 2804 is data indicative of a height of one piece of the large numerical clues displayed in the screen. These pieces of data are each indicated in units of pixels.

The bottom-leftmost column numerical clue coordinate point 2805 indicates a coordinate point of a numerical clue, among numerical clues for respective columns, displayed at the bottom leftmost part in the screen. That is, the bottom-leftmost column numerical clue coordinate point 2805 is data indicative of a position of a numerical clue displayed at the bottom leftmost part in the clue area 102*a* (see FIG. 4). The top-rightmost row numerical clue coordinate point 2806 indicates a coordinate point of a numerical clue, among numerical clues for respective rows, displayed at the top rightmost part in the screen. That is, the top-rightmost row numerical clue coordinate point 2806 indicates a position of a numerical clue displayed at the top rightmost part in the clue area 102*b*.

The column numerical clue offset value 2807 is a value for centering and displaying the large numerical clue in the clue area 102*a*. That is, the column numerical clue offset value 2807 represents a value by which the display position of the large numerical clue is displaced to the right such that the large numerical clue is displayed on the center of a connective column. In a similar manner, the row numerical clue offset value 2808 represents a value by which the display position of the large numerical clue is displaced to the lower side such that the large numerical clue is displayed at the center of a connective row in the clue area 102*b*. The one cell width 2809 indicates a width of one normal cell in the screen. The one cell height 2810 indicates a height of one normal cell in the screen.

Figure 23:
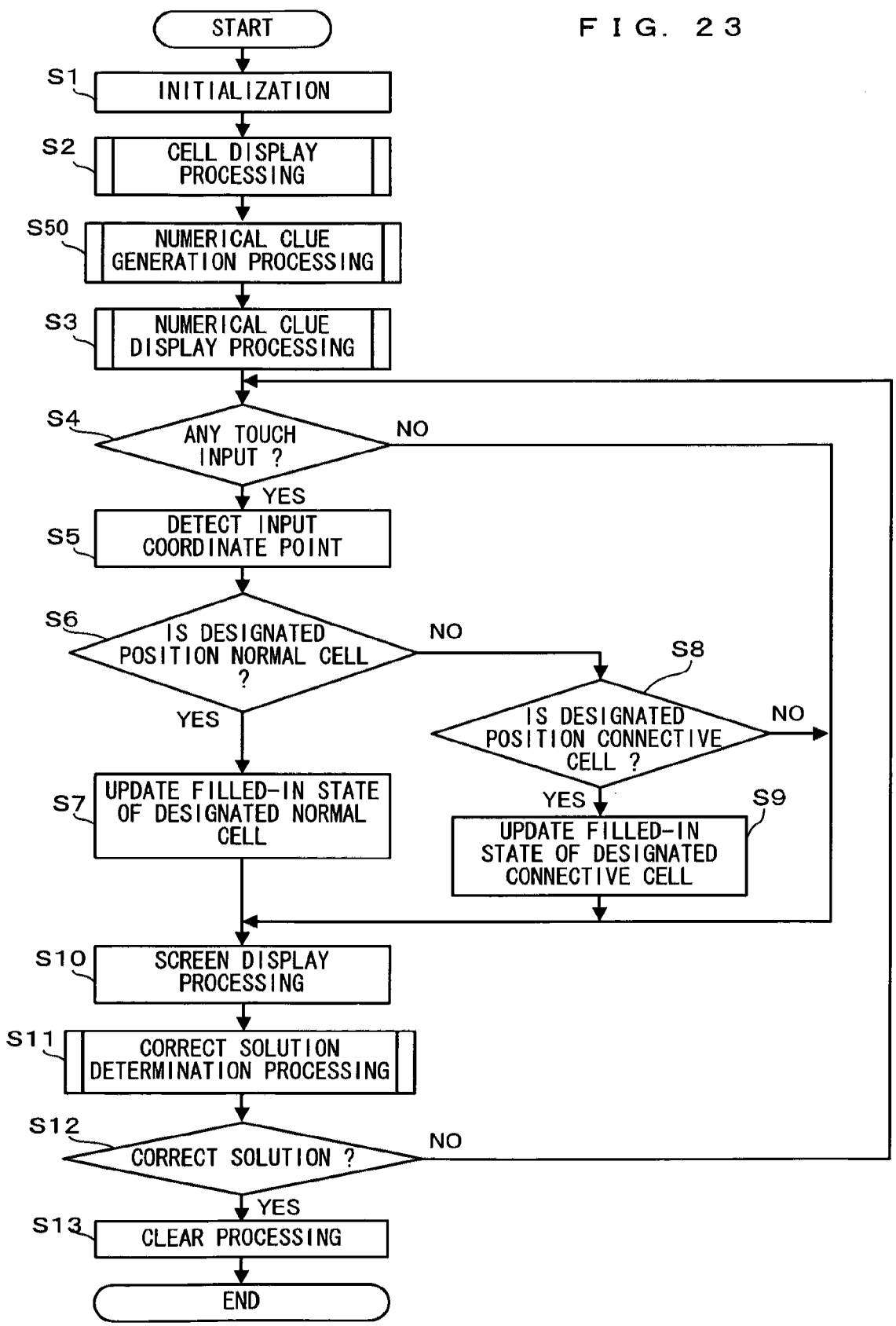
FIG. 23 is a flow chart showing a puzzle game process according to the second embodiment.

Next, with reference to FIGS. 23 to 38, a puzzle game process according to the second embodiment of the present invention will be described. FIG. 23 is a flow chart showing the puzzle game process according to the second embodiment. Steps S1 to S13 in the flow chart are the same as those in the flow chart shown in FIG. 13, and common steps in the both flow charts are each provided with a common reference character. Hereinafter, processing in step S50 in the present embodiment will be mainly described. In FIG. 23, after the solution area is displayed through the processing in step S2, numerical clue generation processing is performed in step S50, and the total numerical clue 253 and the numerical clue information 255 are generated in the work area 281. Through the numerical clue display processing in step S3, the total numerical clue 253 and the numerical clue information 255 respectively generated in the work area 281 are read, and based on the read total numerical clue 253 and the numerical clue information 255, a process for displaying the numerical clue in the clue area 102 is performed.

Figure 24:
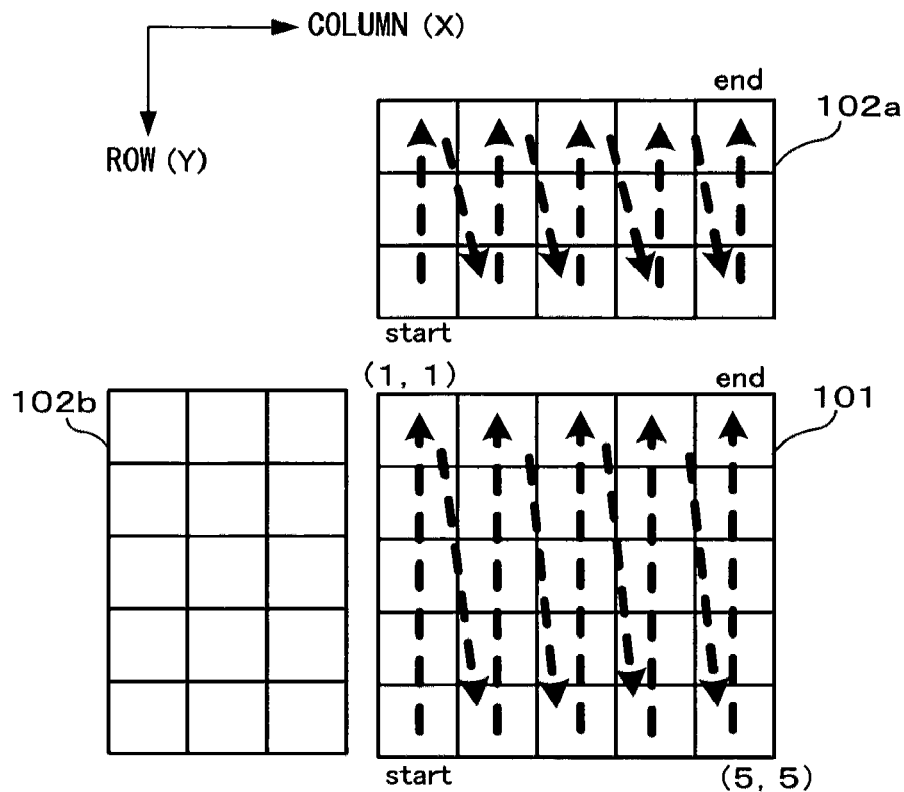
FIG. 24 is a diagram illustrating an outline of numerical clue generation processing.

Here, with reference to FIGS. 24 and 25, an outline of the numerical clue generation processing shown in above-described step S50 will be described. Here, FIGS. 24 and 25 each exemplifies an area having 5 columns×5 rows as an exemplary solution area 101. Columns and rows are respectively numbered from one, and a cell is identified in a form of (column, row). For example, a cell at the top left corner, i.e., a cell in the first column and in the first low is identified as (1, 1), and a cell at the bottom right corner, i.e., a cell in the fifth column and in the fifth row is identified as (5, 5).

In the present processing, the numerical clues corresponding to the respective columns, i.e., the numerical clues to be displayed in the clue area 102a shown in FIG. 4 (herein after referred to as column numerical clue(s)) are generated. Thereafter, numerical clues corresponding to respective rows, i.e., the numerical clues to be displayed in the clue area 102b (hereinafter referred to as row numerical clue(s)) are generated. The column numerical clues are each generated by determining whether or not each of the cells is correct in order as shown with dotted arrows in FIG. 24, and by counting the number of correct cells. As shown in FIG. 24, determination of respective cells in the solution area 101 starts from a cell (1, 5), followed by cells (1, 4), (1, 3) to (1, 1). When the determination of a cell (1, 1) ends, determination is moved onto an adjoining column immediately on the right side, and the determination is performed from a cell (2, 5) to a cell (2, 1). In accordance with a result of the determination of the respective cells, the column numerical clues are generated accordingly from the bottom left corner toward the top right corner.

Figure 25:
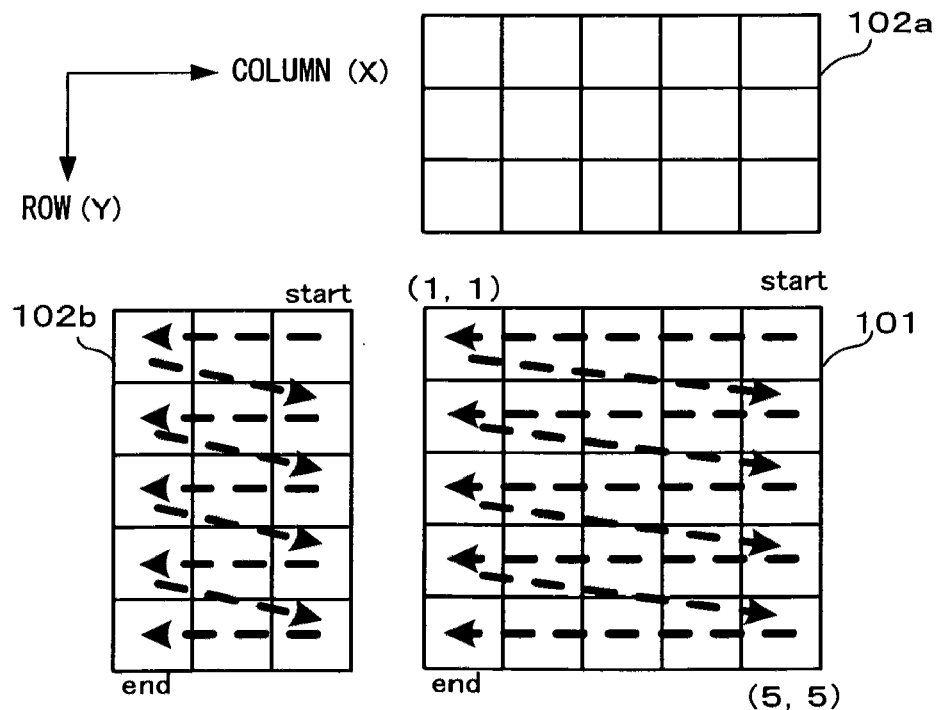
FIG. 25 is a diagram illustrating another outline of the numerical clue generation processing.

On the other hand, the row numerical clues are determined with respect to the respective cells in order as shown in dotted arrows in FIG. 25. That is, the determination starts from a cell (5, 1), and continues towards a cell (1, 1). When the determination of the cell (1, 1) ends, the determination is moved onto the next row, and determination is performed from a cell (5, 2) to a cell (1, 2) in order. Accordingly, in accordance with a result of the determination of the respective cells, the row numerical clues are generated from the top right corner toward the bottom left corner.

Figure 26:
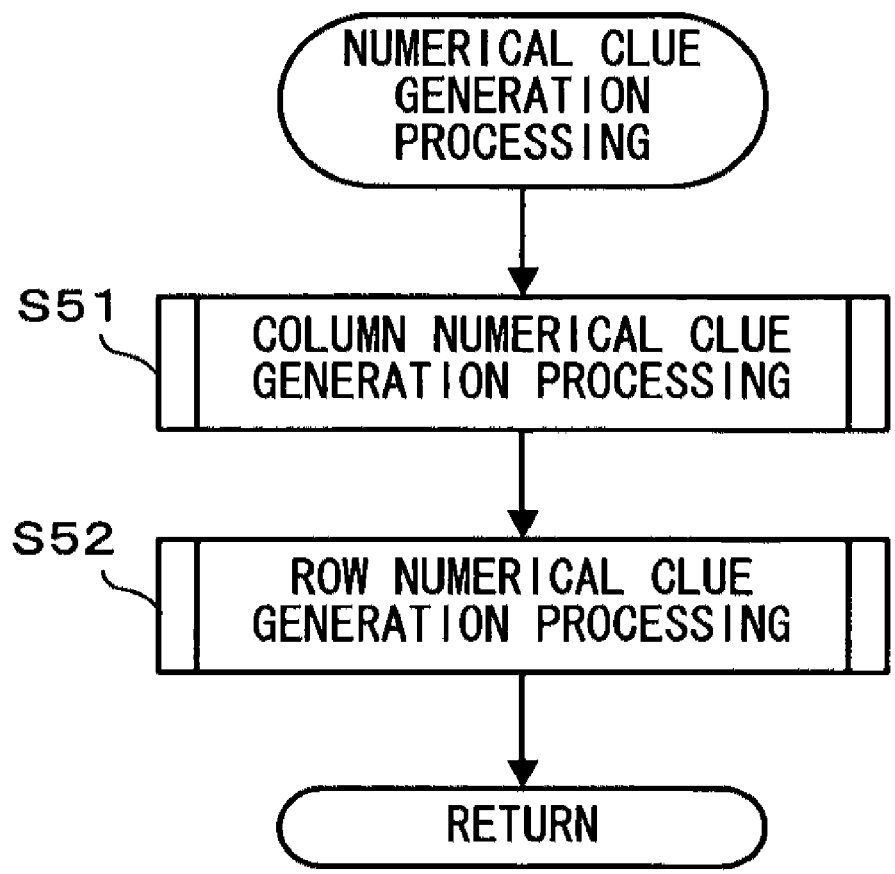
FIG. 26 is a flowchart showing, in detail, the numerical clue generation processing illustrated in step S50 shown in FIG. 23.

Next, the numerical clue generation processing will be described in detail. FIG. 26 is a flow chart showing, in detail, the numerical clue generation processing illustrated in above-described step S50. As shown in FIG. 26, in step S51, column numerical clue generation processing is performed so as to generate numerical clues corresponding to the respective columns, that is, the numerical clues to be displayed in the clue area 102a. Next, in step S52, row numerical clue generation processing is performed so as to generate the numerical clues corresponding to the respective rows, that is, the numerical clues to be displayed in the clue area 102b.

Figure 27:
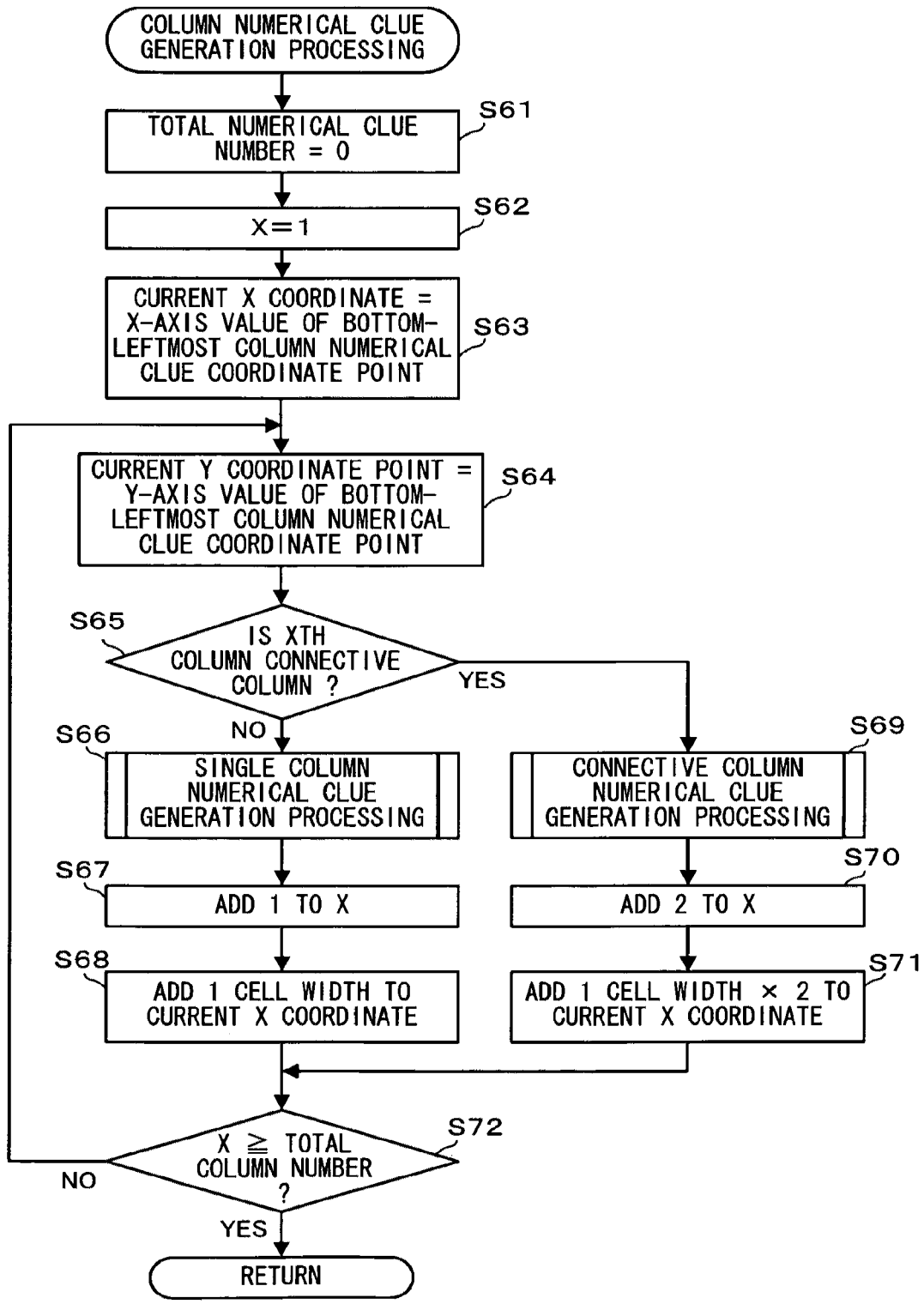
FIG. 27 is a flow chart showing, in detail, column numerical clue generation processing illustrated in step S51 shown in FIG. 26.

FIG. 27 is a flow chart showing, in detail, the column numerical clue generation processing illustrated in above-described step S51. As shown in FIG. 27, first in step S61, "0" is set to the total numerical clue 253 stored in the work area 281. Next in step S62, "1" is set to a variable X indicative of a column number.

Next, in step S63, a coordinate point (display position) of a numerical clue, on a screen, to be initially generated is set. Specifically, the bottom-leftmost column numerical clue coordinate point 2805 is read from the display relating data 280, and a value of an X-axis of the coordinate point is set as a value of an X-axis of the current coordinate point 282 (hereinafter referred to as a current X coordinate).

In subsequent step S64, a value of a Y-axis of the current coordinate point 282 (hereinafter referred to as a current Y coordinate) is set. Specifically, the bottom-leftmost column numerical clue coordinate point 2805 is read from the display relating data 280, and a value of the Y-axis of the coordinate point is set as the current Y coordinate. Accordingly, the numerical clue to be initially generated is identified as a number to be displayed at the bottom leftmost part in the clue area 102a.

Next, in step S65, whether or not a column indicated by the variable X (hereinafter referred to as an X column) is a connective column is determined. Specifically, the CPU core 21 reads the column connective flag 257 from the RAM 24, and determines whether a value of the Xth digit is "0" or "1". When a result of the determination is "0", which indicates that a column is not a connective column (NO in step S65), numerical clue generation processing for a single column described later is executed in step S66, and the numerical clue for the Xth column is generated. Subsequently, in step S67, 1 is added to the variable X. That is, a column to be processed for checking is set to a column next to the Xth column. Next, in step S68, a value of the one cell width 2589 is added to the current X coordinate. That is, processing is performed so as to set a position of a numerical clue to be subsequently generated to a column immediately on the right of the Xth column. Next, in step S72, whether or not the variable X is equal to or greater than the total column number 252a is determined. That is, whether or not all the columns have been processed is determined. As a result, when the variable X is not equal to or greater than the total column number 252a, the processing is repeated after returning to step S64. On the other hand, when the variable X is equal to or greater than the total column number 252a, the column numerical clue generation process ends.

On the other hand, as a result of the determination in step S65, when the Xth digit of the value of the column connective flag 257 represents "1" (YES in step S65), connective column numerical clue generation processing is performed in step S69. Subsequently in step S70, 2 is added to the variable X. That is, a column to be processed for checking is set to a column which is two columns on the right of the Xth column. Subsequently in step S71, a value obtained by doubling the one cell width 2589 is added to the current X coordinate. That is, processing is performed so as to set a position of a numerical clue to be subsequently generated to a column which is two columns on the right of the Xth column. Next, the processing proceeds to above-described step S72, and whether or not all the columns have been processed is determined. As a result, when the variable X is not equal to or greater than the total column number 252a, the processing is repeated after returning to step S64. On the other hand, when the variable X is equal to or greater than the total column number 252a, the column numerical clue generation processing ends.

Figure 28:
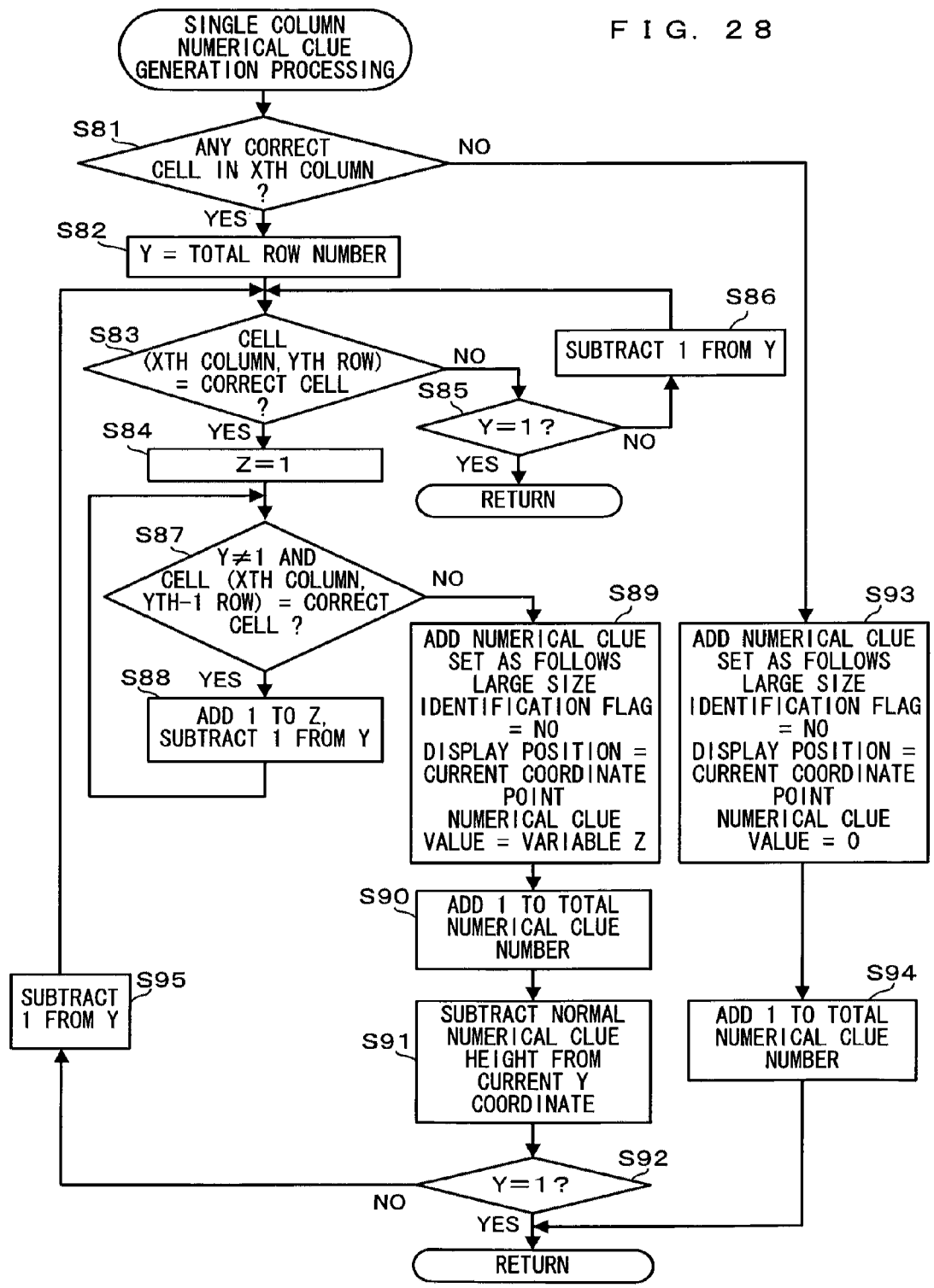
FIG. 28 is a flow chart showing, in detail, single-column numerical clue generation processing illustrated in step S66 shown in FIG. 27.

Next, single-column numerical clue generation processing illustrated in step S66 will be described with reference to FIG. 28. As shown in FIG. 28, first in step S81, whether or not a cell whose correctly solved state is a black cell is allocated in the Xth column is determined. Hereinafter, a cell whose correctly solved state is the black cell is referred to as a "correct cell". Specifically, the CPU core 21 reads correctly solved states 2547 of respective cells allocated in the Xth column. The CPU core 21 then determines whether or not there is at least one cell whose correctly solved state 2547 is the "black cell". As a result of the determination, when there is at least one cell which is the "black cell" (YES in step S81), a variable Y indicative of a row number is set in subsequent step S82. Specifically, the total row number 252b is read from the RAM 24, and the value of the total row number 252b is set to the variable Y.

Next, in step S83, whether or not a cell indicated as (variable X, variable Y), i.e., a cell (Xth column, Yth row) is a correct cell is determined. In other words, whether or not the correctly solved state 2547 of the cell is the "black cell" is determined. As a result, when the cell is determined not to be the correct cell (NO in step S83), whether or not the variable Y is "1" is determined in step S85. That is, whether or not all the cells in the column currently being processed have been checked is determined. As a result, when the variable Y is not "1" (NO in step S85), 1 is subtracted from the variable Y in step S86, and the processing is returned to step S83. On the other hand, when the variable Y is "1", the single-column numerical clue generation processing ends.

On the other hand, as a result of the determination in step S83, when the cell is determined to be the correct cell (YES in step S83), "1" is set to a variable Z which is to be counted up to be a numerical clue. That is, each time a correct cell is detected, the value of the variable Z increases.

Next, in step S87, whether or not a cell immediately above a cell currently being processed is a correct cell is determined. Specifically, whether or not the correctly solved state 2547 of a cell (variable X, variable Y−1) is the "black cell (correct cell)" are determined under the situation in which a value of "Y" represents a value other than "1". As a result, when the cell is the correct cell (YES in step S87), 1 is added to the variable Z. Further, 1 is subtracted from the variable Y. That is, the number of the correct cells is increased by 1, and processing is performed so as to set a cell immediately above the cell (variable X, variable Y−1) as a cell to be subsequently processed for checking. The processing is then repeated after returning to step S87.

On the other hand, as a result of the determination in step S87, when the cell immediately above the currently being processed cell is determined not to be a correct cell (NO in step S87), processing is performed in step S89 so as to add 1 numerical clue to the numerical clue information 255 in the work area 281. Specifically, the CPU core 21 sets "NO" to the large size identification flag 2553, sets a value of a variable "current coordinate point" to the display position 2554, and sets the variable Z to the numerical clue value 2552. Further, the CPU core 21 adds a numerical clue, which has a predetermined numerical clue number 2551 provided thereto (in the present embodiment, the number is provided to each of the numerical clues from 1 consecutively in order of generation), to the numerical clue information 255.

Next, in step S90, 1 is added to the total numerical clue number 253. In subsequent step S91, the normal numerical clue height 2802 is subtracted from the current Y coordinate. That is, processing is performed so as to set a display position of a numerical clue to be subsequently generated to a position which is immediately above a position of the one normal numerical clue having been generated.

Next, in step S92, whether or not the variable Y is "1", i.e., whether or not all the cells in the column currently being processed have been checked is determined. As a result, when the variable Y is not "1" (NO in step S92), 1 is subtracted from the variable Y in step S95, and the processing returns to step S83. On the other hand, when the variable Y is "1", numerical clue generation processing of the single column ends.

Figure 29:
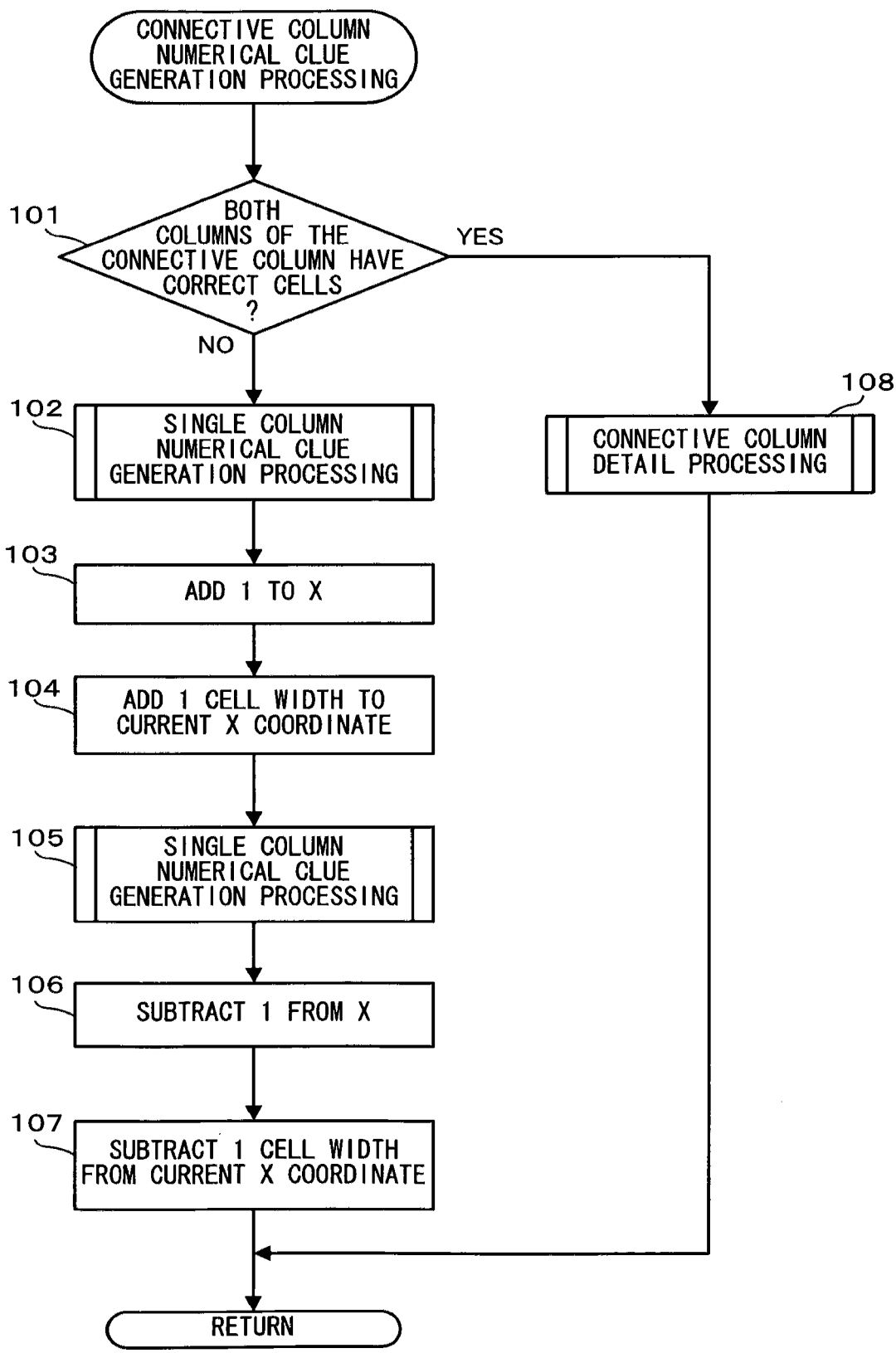
FIG. 29 is a flow chart showing, in detail, connective-column numerical clue generation processing illustrated in step S69 shown in FIG. 27.

Next, the connective-column numerical clue generation processing shown in step S69 will be described, with reference to FIG. 29. First, in step S101, whether or not two columns which are connected to each other (hereinafter referred to as a connective column) include a correct cell is determined. That is, the correctly solved state 2547 of respective cells in the connective column is read. Then, whether or not each of the two columns constituting the connective column includes the correct cell is determined. As a result of the determination, when neither of the two columns, which are connected to each other, includes the correct cell (NO in step S101), the single-column numerical clue generation processing is performed in subsequent step S102. That is, the single-column numerical clue generation processing is performed with respect to a column on the left side of the connective column. The process is the same as the process performed in step S66 as above described with reference to FIG. 28. Therefore, detail description thereof will be omitted.

Next, in step S103, 1 is added to the variable X. That is, a column to be processed for checking next is set to the next column immediately on the right side. Next, in step S104, the one cell width 2809 is added to the current X coordinate. That is, a position, in which a numerical clue is to be generated, is set to a position corresponding to the next column immediately on the right side of the column having been processed.

Next, in step S105, the single-column numerical clue generation process is performed. That is, in a column on the right side of the connective column, the single-column numerical clue generation processing is performed. Detail description of the processing will be also omitted.

Next, in step S106, 1 is subtracted from the variable X. In subsequent step S107, the one cell width 2809 is subtracted from the current X coordinate point. That is, although a column to be subsequently processed for checking is supposed to be set to a column which is two columns on the right of the currently processed column in order to process as the connective column, the column to be processed is set to a column immediately on the right side. The connective-column numerical clue generation processing ends.

On the other hand, as a result of the determination in step S101, when both of the two columns constituting the connective column have correct cells (YES in step S101), connective-column detail processing is performed in subsequent step S108. Thereafter, the connective-column numerical clue calculation processing ends.

FIGS. 30 to 33 are flow charts each showing, in detail, the connective-column detail processing illustrated in step S108. As shown in FIG. 30, in step S110, a value of an X-axis of the connective current coordinate point 282 (hereinafter referred to as a connective current X coordinate) is set. Specifically, a value obtained by adding the one cell width 2809 to the current X coordinate is set as the connective current X coordinate. Here, the connective current coordinate point is a coordinate point indicative of a left side position in the connective column. In other words, the connective current coordinate point is a coordinate point corresponding to a column on the left side in an area (an area having a width of two columns) in which a large numerical clue to be generated is to be displayed.

In subsequent step S111, a value of a Y-axis of the connective current coordinate point 282 (hereinafter referred to as a connective current Y coordinate) is set. Specifically, the value of the current Y coordinate is set as the connective current Y coordinate.

Next, in step S112, a value of the total row number 2812b is set to the variable Y.

Next, in step S113, whether or not at least one of cells in the Yth row in the connective column is a correct cell is determined. As a result, when neither of the cells is determined to be the correct cell (NO in step S113), the processing proceeds to step S133 described below.

On the other hand, it is determined that either or both of the cells in the Yth row in the connective column is/are the correct cell(s) (YES in step S113), "0" is set to the variable Z in subsequent step S114.

Figure 31:
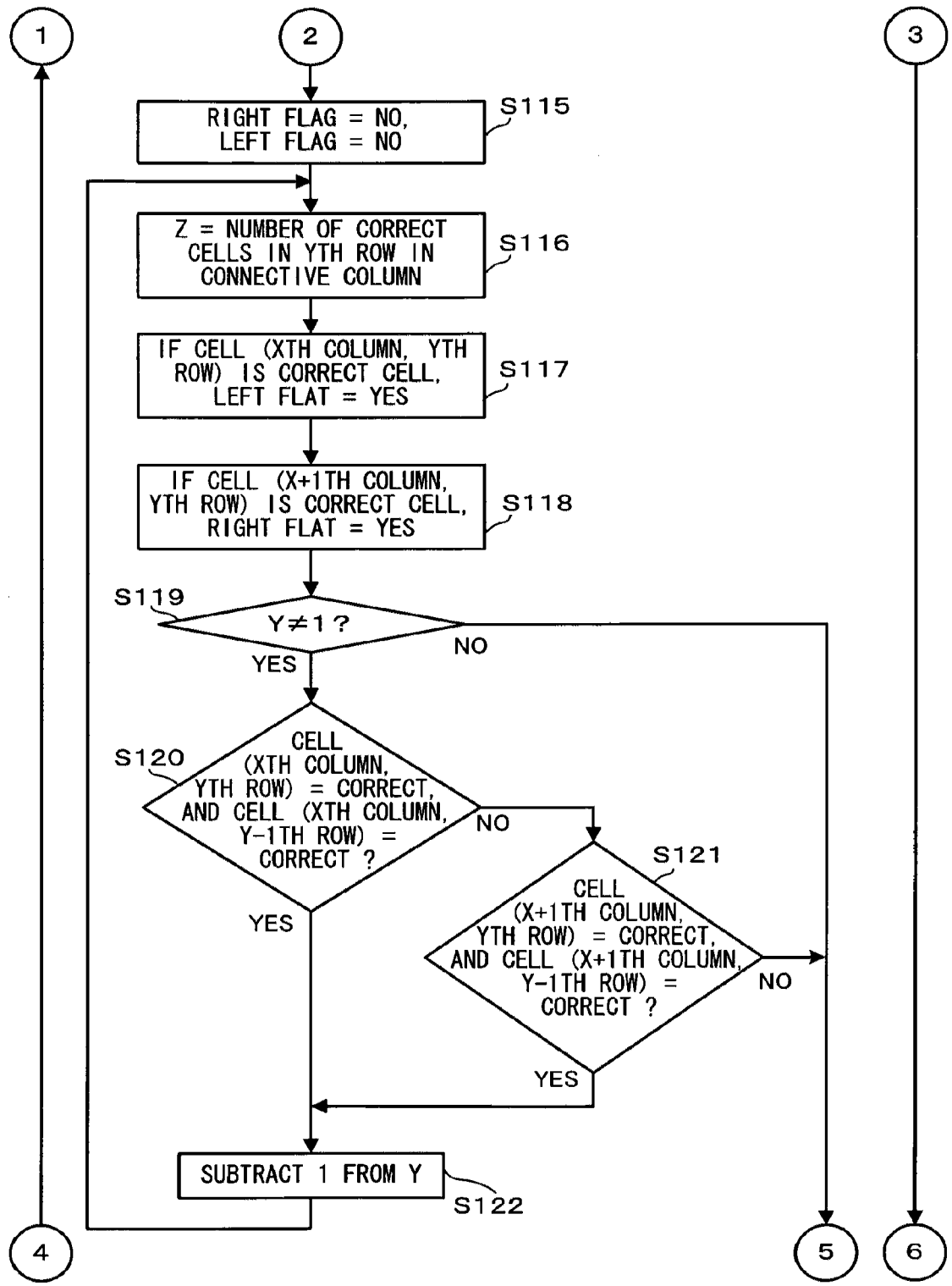
FIG. 31 is a flow chart showing, in detail, another piece of connective-column detail processing illustrated in step S108 shown in FIG. 29.

Next, "NO" is set to a right side flag and a left side flag in step S115 illustrated in FIG. 31. The flags respectively indicate whether or not a right side cell and a left side cell in the connective column are the correct cells.

Next, in step S116, the number of correct cells in the Yth row in the connective column is set (added) to the variable Z. In step S117, whether or not the cell (Xth column, Yth row), i.e., a cell on the left side of the connective column currently being processed, is the correct cell is determined based on the correctly solved state 2547 of the cell. When the cell is the correct cell, "YES" is set to the left side flag.

In subsequent step S118, whether or not a cell (X+1th column, Yth row), which is on the right side in the connective column currently being processed, is the correct cell is determined. When the cell is the correct cell, "YES" is set to the right side flag.

Next, in step S119, whether or not the variable Y is "1" is determined. When the variable Y is "1" (NO in step S119), the processing proceeds to step S123 described later. On the other hand, when the variable Y is not "1" (YES in step S119), whether or not the cell (Xth column, Yth row) is the correct cell and whether or not a cell (Xth column, Y–1th row) is the correct cell are determined. As a result, both of the cells are determined to be the correct cells (YES in step S120), 1 is subtracted from the variable Y in step S122. Accordingly, a row immediately above the row having been processed is set as a row to be processed next. The processing is then repeated after returning to step S116.

On the other hand, as a result of the determination in step S120, when it is determined that either or neither of the cells is the correct cell (NO in step S120), whether or not the cell (X+1th column, Yth row) is the correct cell and whether or not a cell (X+1th column, Y–1th row) is a correct cell are determined. That is, whether or not black cells are contiguously allocated in a Y-axis direction (an upper direction) in the column on the right side in the connective column. As a result, when both of the cells are determined to be the correct cells (YES in step S121), 1 is subtracted from the variable Y in step S122. The processing is then repeated after returning to step S116.

Figure 32:
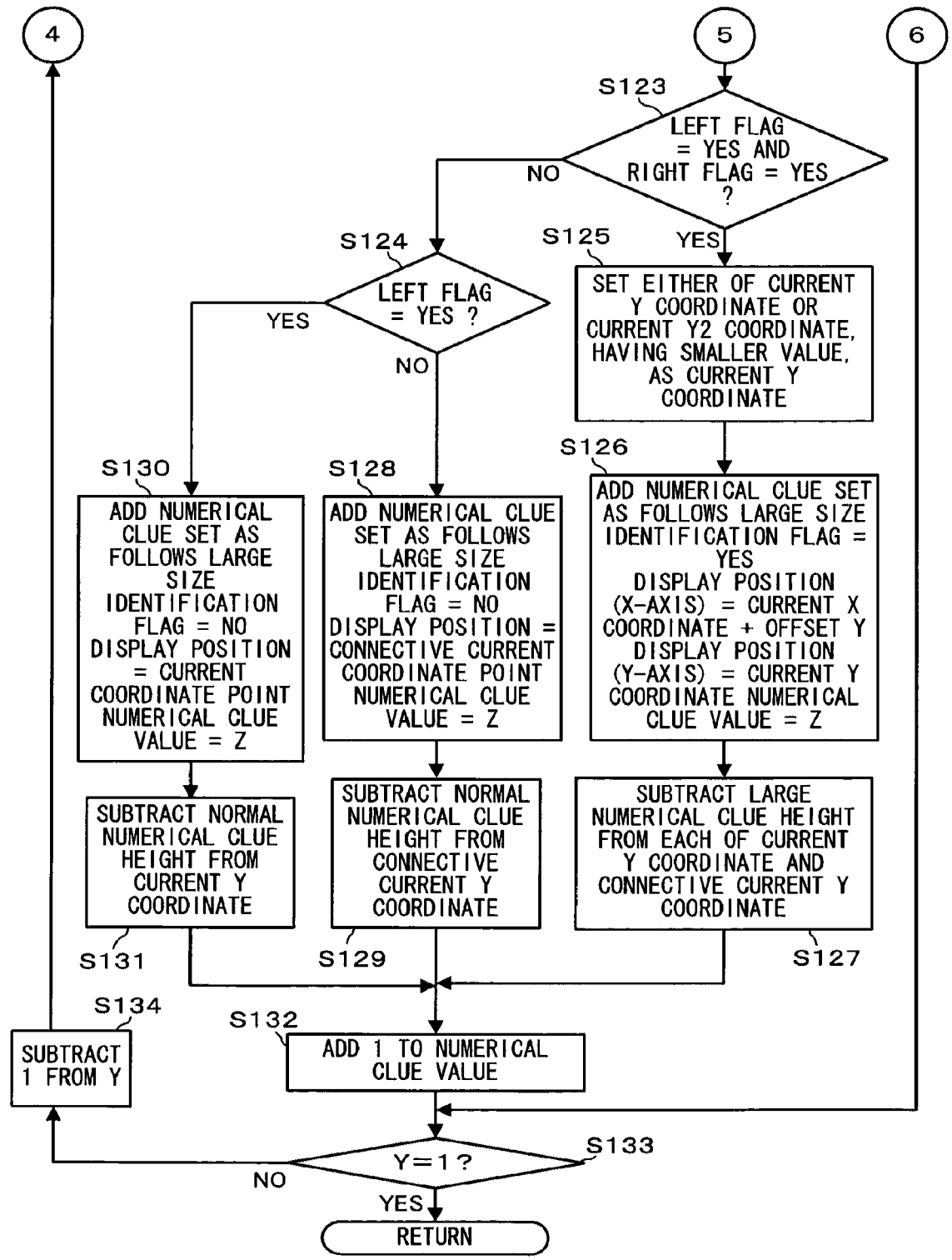
FIG. 32 is a flow chart showing, in detail, another piece of connective-column detail processing illustrated in step S108 shown in FIG. 29.

On the other hand, as a result of the determination in step S121, when either or neither of the cells is determined to be the correct cell (NO in step S121), whether or not the right side flag and the left side flag both indicate "YES" is determined in subsequent step S123 illustrated in FIG. 32. That is, whether or not two cells in the connective column currently processed are both correct cells is determined. As a result of the determination, when the both flags indicate "YES" (YES in step S123), either of the current Y coordinate or the connective current Y coordinate, having a smaller value, is updated as a new current Y coordinate.

Next, in step S126, processing is performed so as to add one large numerical clue to the numerical clue information 255 in the work area 281. Specifically, the CPU core 21 sets "YES" to the large size identification flag 2553, sets a value of the current coordinate point 282 to the display position 2554, and sets the variable Z to the numerical clue value 2552. The CPU core 21 also adds the numerical clue, which has the numerical clue number 2551 provided thereto, to the numerical clue information 255.

Next, in step S127, the large numerical clue height 2804 is subtracted from the current Y coordinate and the connective current Y coordinate. Accordingly, a display position of a numerical clue to be subsequently generated is set at a position immediately above a position of the one large numerical clue having been generated. Thereafter, the processing proceeds to step S132 described later.

On the other hand, as a result of the determination in above-described step S123, when it is determined that both of the right side flag and the left side flag do not indicate "YES" (NO in step S123), whether or not the left side flag indicates "YES" is determined in step S124. That is, whether or not only the left side cell in the connective column currently being processed is the correct cell is determined. As a result, when the left side flag is determined to indicate "YES" (YES in step S124), processing is performed, in step S130, such that one normal numerical clue corresponding to the left side column in the connective column currently being processed is added to the numerical clue information 255 in the work area 281. Specifically, the CPU core 21 sets "NO" to the large size identification flag 2553, sets a value of the current coordinate point 282 to the display position 2554, and sets the variable Z to the numerical clue value 2552. The CPU core 21 further adds the numerical clue, which has the numerical clue number 2551 provided thereto, to the numerical clue information 255.

In subsequent step S131, the normal numerical clue height 2802 is subtracted from the current Y coordinate. Thereafter, the processing proceeds to step S132 described later.

On the other hand, as a result of the determination in step S124, when it is determined that the left side flag does not indicate "YES" (NO in step S124), only the right side cell in the connective column currently being processed is the correct cell. In this case, processing is performed, in step S128, such that one normal numerical clue corresponding to the column on the right side in the connective column currently being processed is added to the numerical clue information 255 in the work area 281. Specifically, the CPU core 21 sets "NO" to the large size identification flag 2553, sets a value of the connective current coordinate point 283 to the display position 2554, and sets the variable Z to the numerical clue value 2552. Further, the CPU core 21 adds the numerical clue, which has the numerical clue number 2551 provided thereto, to the numerical clue information 255.

In subsequent step S129, a normal numerical clue height 2802 is subtracted from the connective current Y coordinate. Thereafter, the processing proceeds to step S132 described later.

Next, in step S132, 1 is added to the total numerical clue number 253. In subsequent step S133, whether or not the variable Y is "1" is determined. As a result, when the variable Y is not "1" (NO in step S133), 1 is subtracted from the variable Y in step S134, and the processing is repeated after returning to step S113. On the other hand, when the variable Y is "1" (YES in step S133), the numerical clue generation processing of the connective column ends.

Next, the row numerical clue generation processing illustrated in step S52 shown in above-described FIG. 26 will be described. The present processing basically has the same algorithm as the above-described column numerical clue generation processing. However, the present processing is different from the column numerical clue generation processing in that the processing is performed in units of rows, as shown in FIG. 25, instead of in units of columns. Hereinafter, points which are different from the column numerical clue generation processing will be mainly described.

Figure 33:
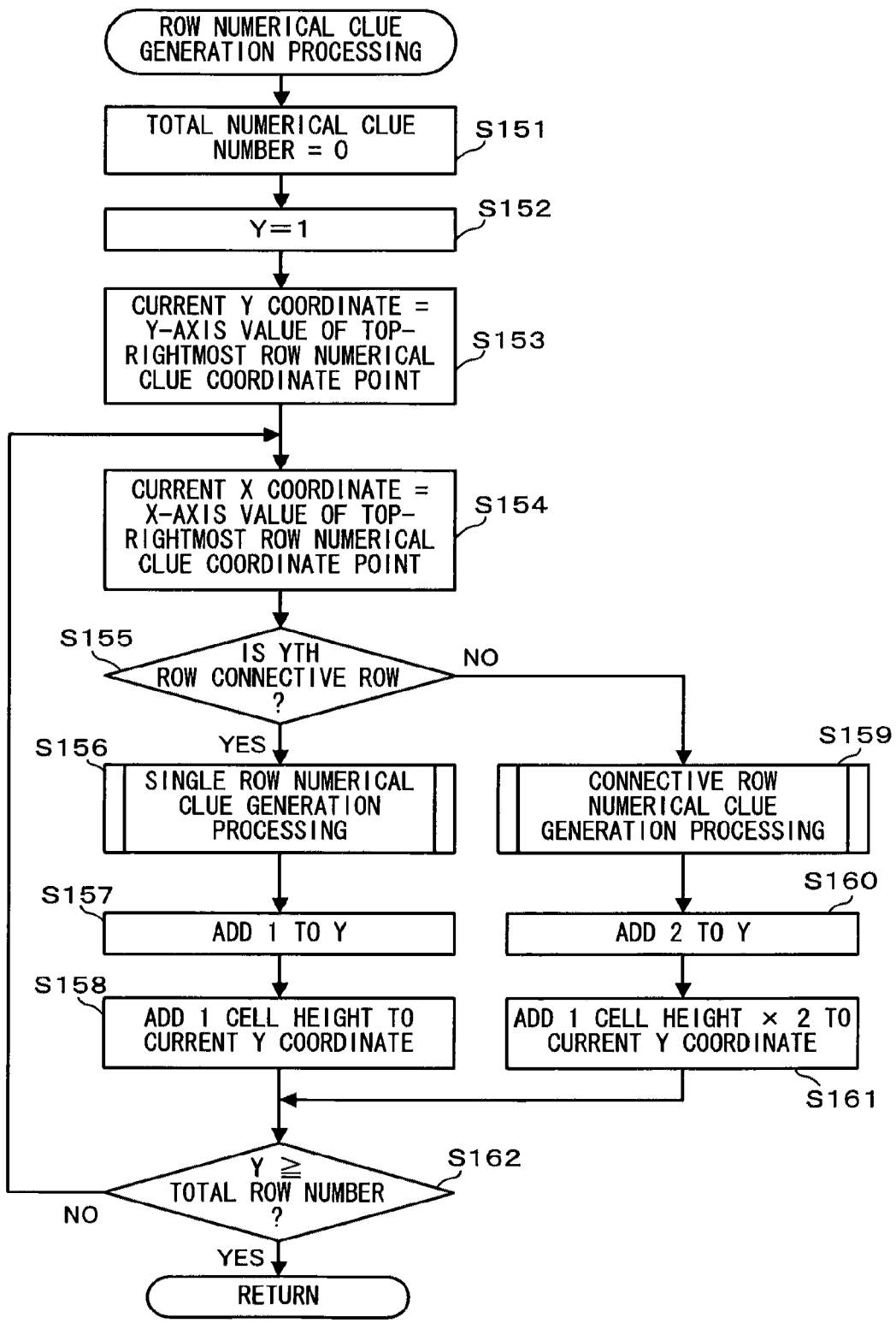
FIG. 33 is a flowchart showing, in detail, row numerical clue generation processing illustrated in step S52 shown in FIG. 26.

FIG. 33 is a flow chart showing, in detail, the row numerical clue generation processing illustrated in above-described step S52. The flow of the processing illustrated in FIG. 33 is basically the same as the flow of the column numerical clue generation processing described above with reference to FIG. 27. However, the row numerical clue generation processing is different from the column numerical clue generation processing in that the processing is performed by using a variable Y (in steps S152, S155, S157, S160, S162) instead of the variable X, and by applying a current X coordinate (steps S153, S154, S158, S161) instead of the current Y coordinate.

Figure 34:
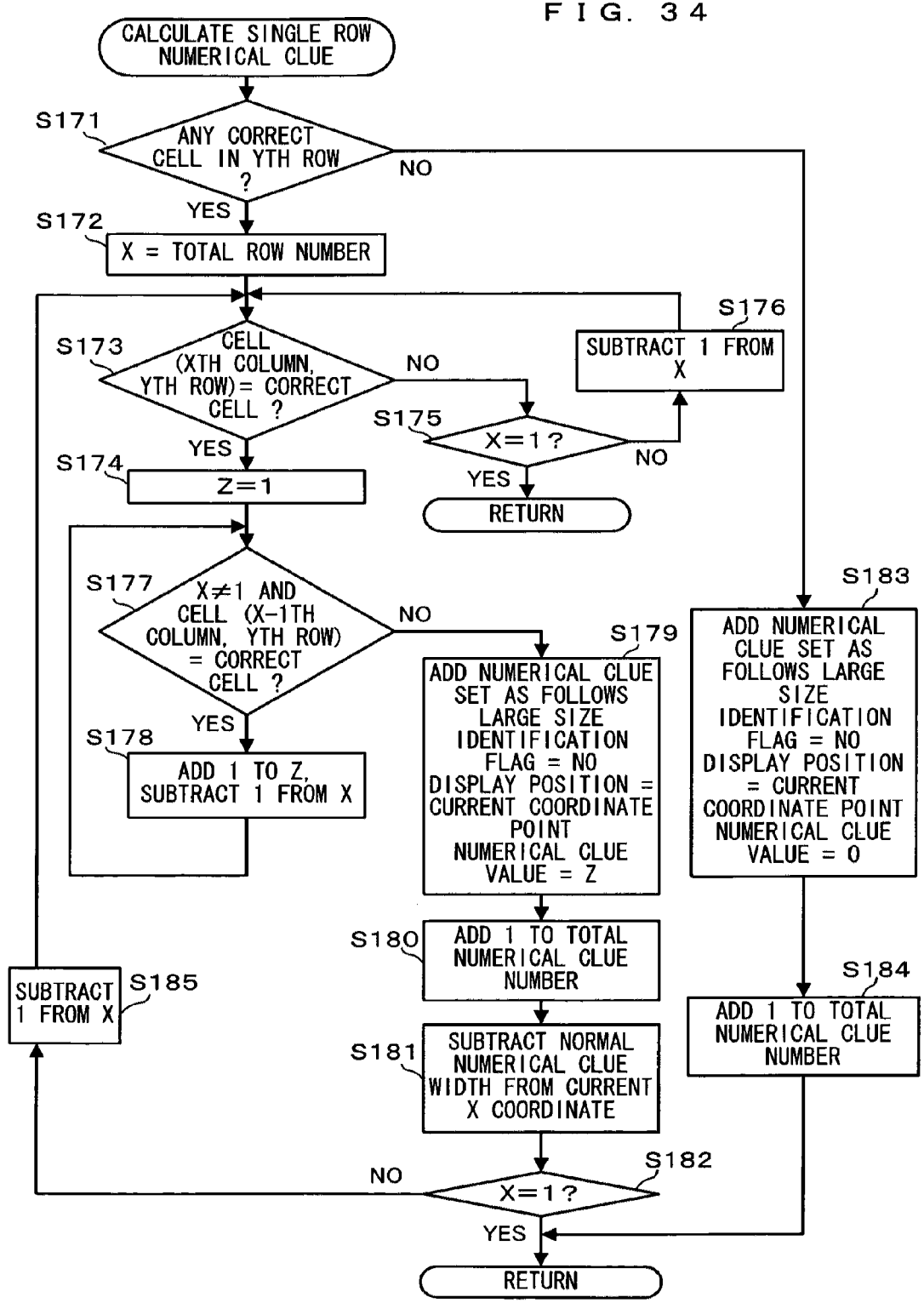
FIG. 34 is a flow chart showing, in detail, single-row numerical clue generation processing illustrated in step S156 shown in FIG. 33.

FIG. 34 is a flow chart showing, in detail, a numerical clue generation processing for a single row, which is illustrated in step S156 shown in FIG. 33. The flow of the processing shown in FIG. 34 is basically the same as the above-described single-column numerical clue generation processing, but is different in the following points. First, the processing is performed by using the variable X instead of the variable Y. Secondly, the total column number 252a is set as the variable X in step S172. And thirdly, the normal numerical clue width 2801 is subtracted from the current X coordinate in step S181.

Figure 35:
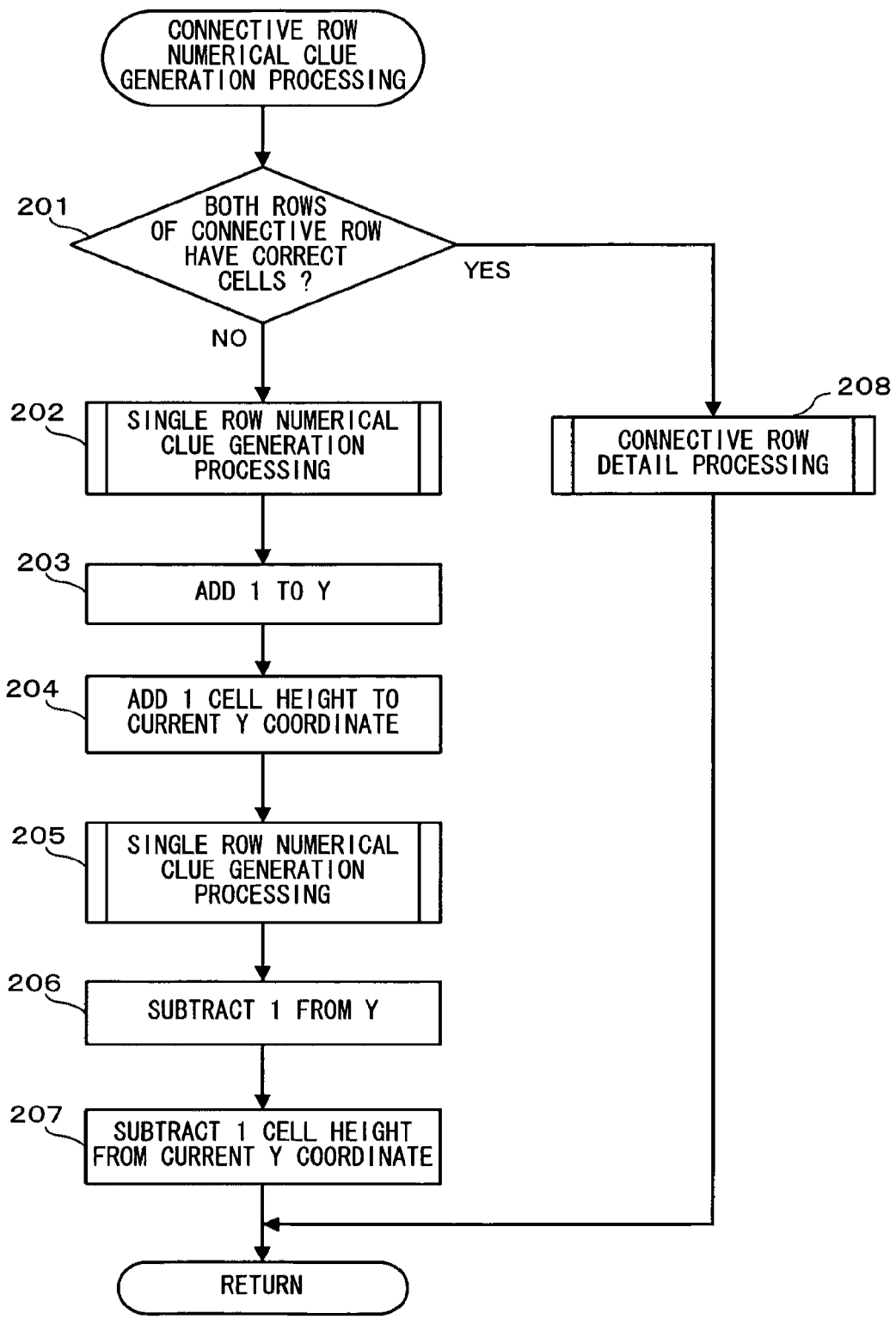
FIG. 35 is a flow chart showing, in detail, connective-row numerical clue generation processing illustrated in step S159 shown in FIG. 33.

FIG. 35 is a flowchart showing, in detail, the connective row numerical clue generation processing illustrated in step S159 shown in FIG. 33. The flow of the processing shown in FIG. 35 is different from the connective column numerical clue generation processing as above described with reference to FIG. 29 in the following points. First, the variable Y is processed instead of the variable X in steps S203 and S206. Secondly, in step S204, the one cell height 2810 is added to the current Y coordinate. And thirdly, in step S207, the one cell height 2810 is subtracted from the current Y coordinate. However, with respect to other points than these described points, the present processing has the same flow as the connective column numerical clue generation processing.

Figure 36:
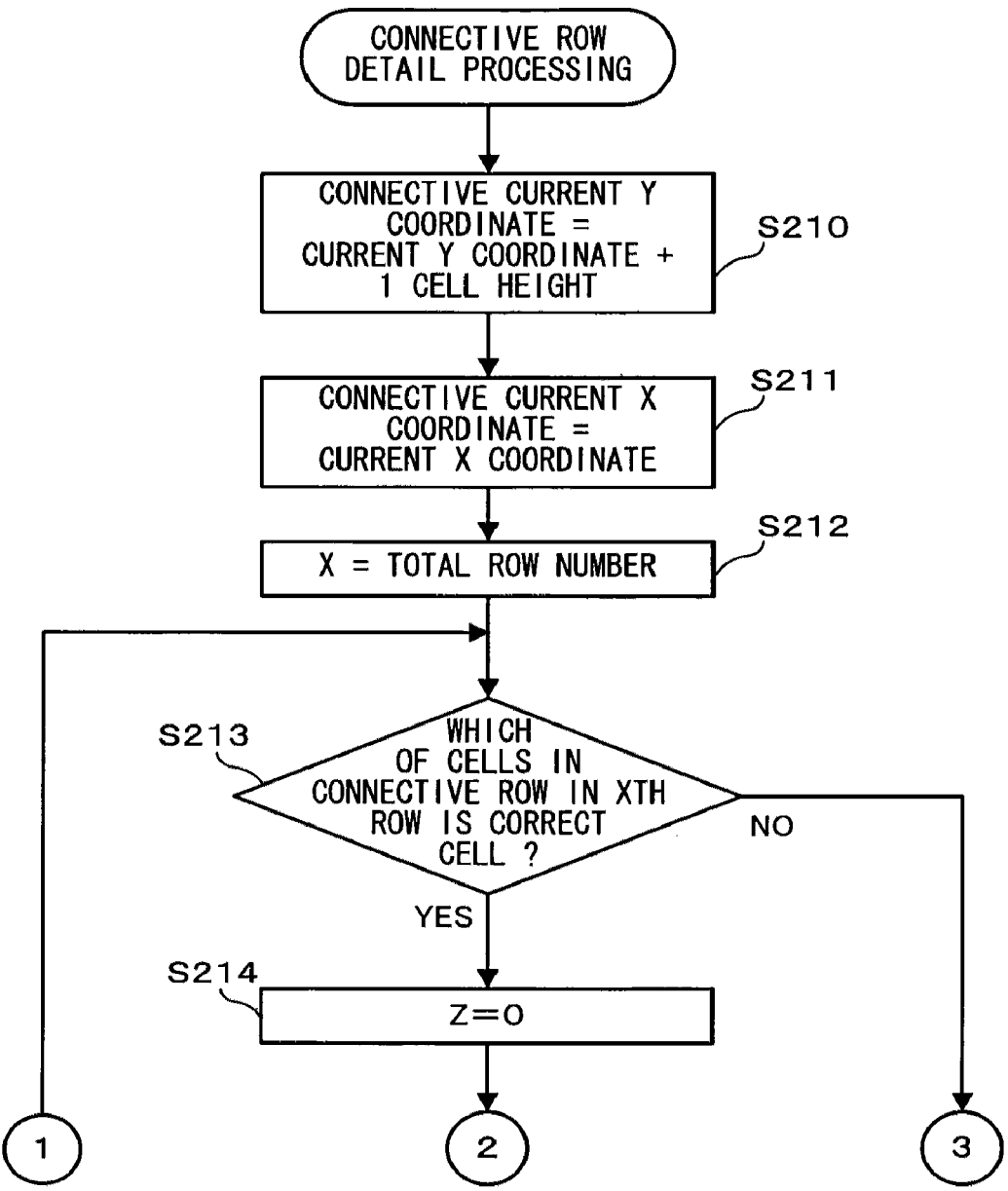
FIG. 36 is a flow chart showing, in detail, connective-row detail processing illustrated in step S208 shown in FIG. 25.
Figure 37:
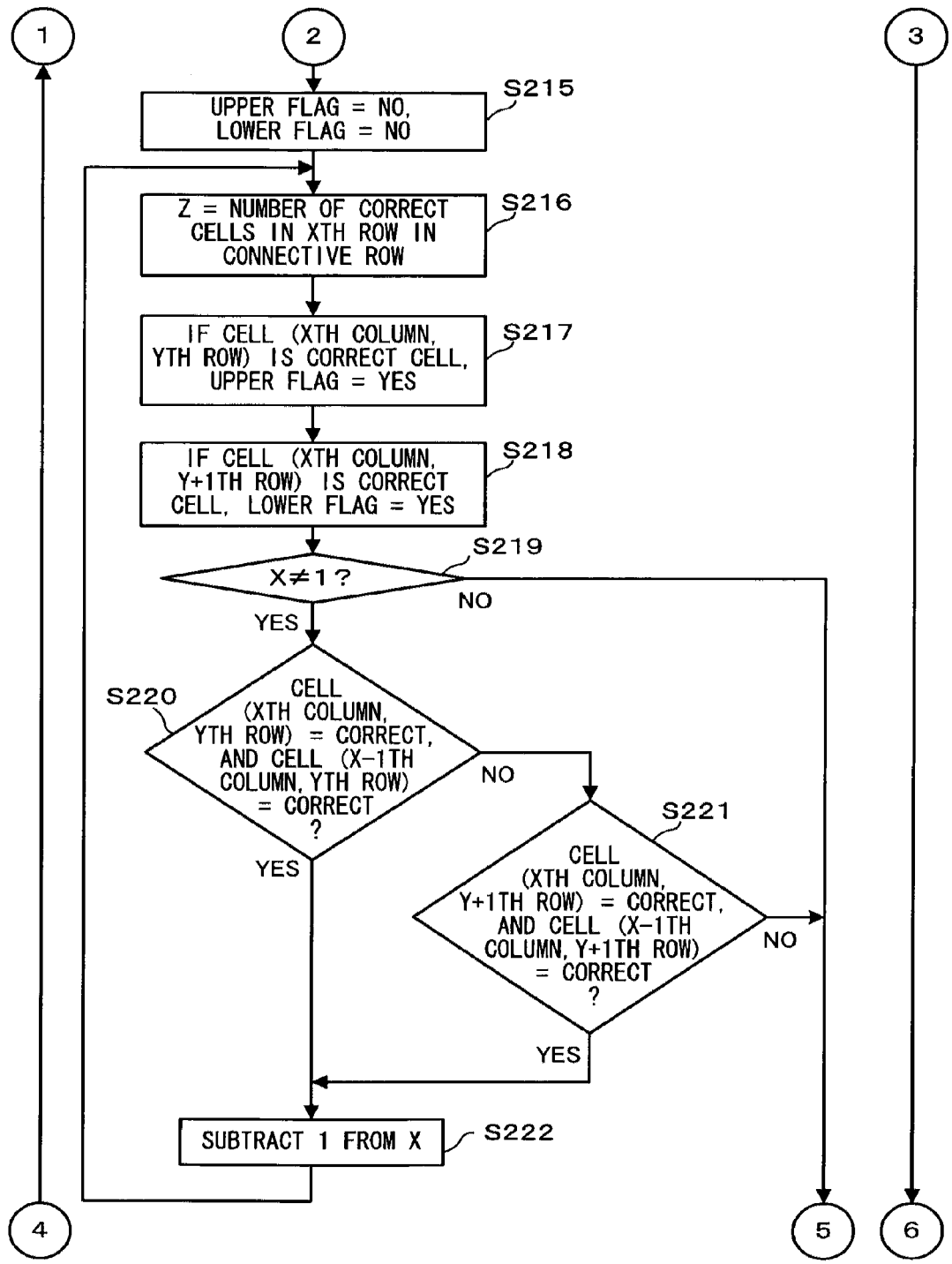
FIG. 37 is a flowchart showing, in detail, another piece of connective-row detail processing illustrated in step S208 shown in FIG. 25.
Figure 38:
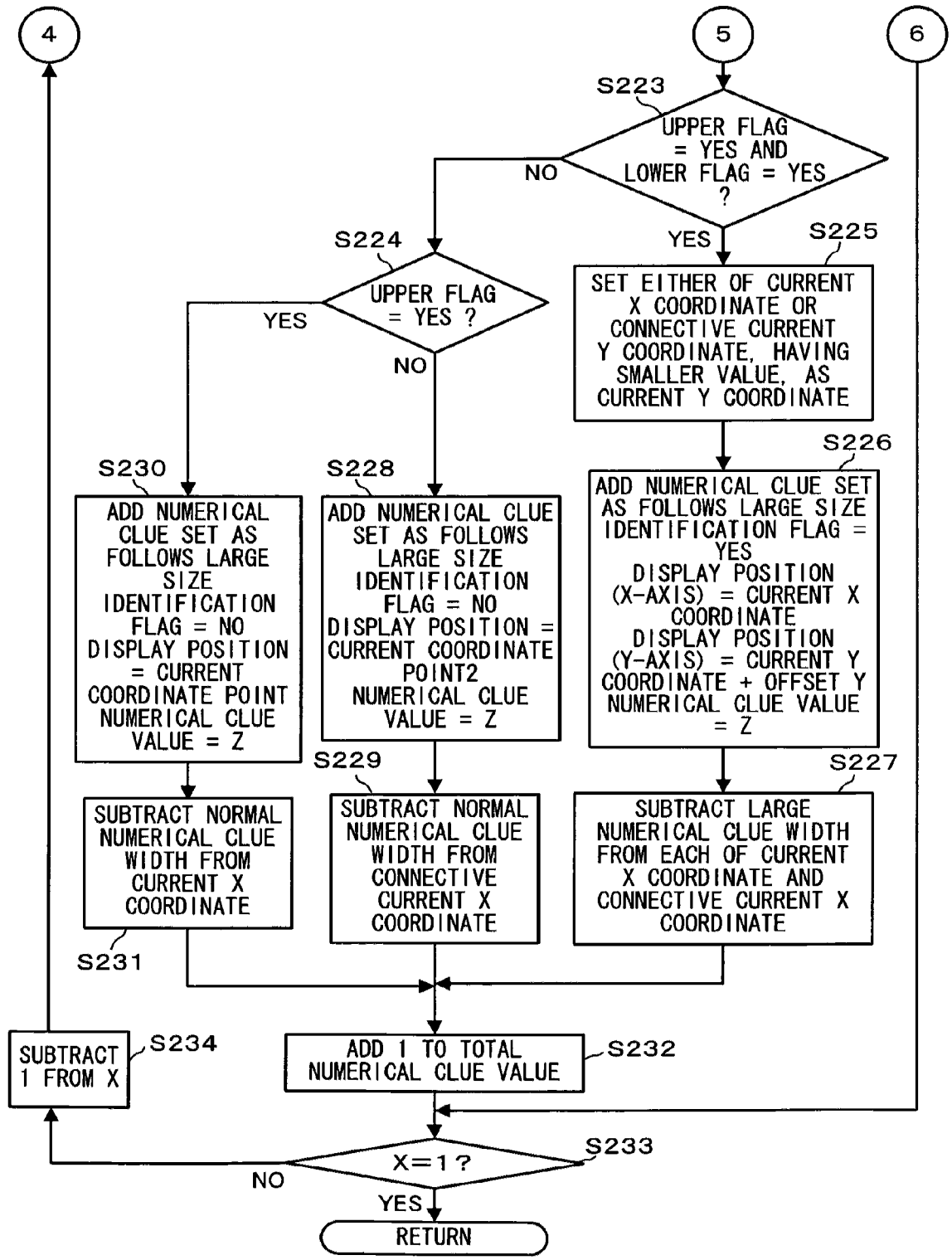
FIG. 38 is a flow chart showing, in detail, another piece of connective-row detail processing illustrated in step S208 shown in FIG. 25.

FIGS. 36 to 38 are each a flow chart showing, in detail, the connective row detail processing illustrated in step S208 shown in FIG. 35. The flow of the present processing is also basically the same as the connective column detail processing as above described with reference to FIGS. 30 to 33, but is different in the following points. First, the variable Y is replaced with the variable X. Secondly, the current Y coordinate and the connective current Y coordinate are replaced with the current X coordinate and the connective current X coordinate, respectively. Further, the present processing is different in that the normal numerical clue height 2802 is replaced with the normal numerical clue width 2801 (steps S229, S231), and the large numerical clue height 2804 is replaced with the large numerical clue width 2803 (step S227). Still further, the present processing is different in that, an upper side flag and a lower side flag are assigned to an upper side cell and a lower side cell in a connective row, respectively (steps S215, S217, S218, S223, and S224). The upper side flag and the lower side flag indicate whether or not the upper side cell and the lower side cell in the connective row are the correct cell. Here ends description of the row numerical clue generation processing.

As above described, in the second embodiment, based on the correctly solved state 2547 set to the cell information 254, the numerical clue information 255 is generated when a game is started. Therefore, the numerical clue information need not be stored in the memory card 17, and consequently a program capacity of the puzzle game can be saved.

While the invention has been described in detail, the foregoing description is in all aspects illustrative and not restrictive. It is understood that numerous other modifications and variations can be devised without departing from the scope of the invention.

What is claimed is:

1. A puzzle game apparatus, comprising:
    a display device;
    a user input device, and
    a processor executing a program stored on a non-transitory storage medium, the program when executed by the processor causes the game apparatus to:
    display a solution area having a plurality of cells arranged in a matrix;
    display a clue area in which a plurality of numbers each representing the number of cells to be marked, wherein the clue area is adjacent the cells in the solution area;
    display in the clue area a normal numerical clue which corresponds to a row or a column in the matrix and represents the number of cells to be marked in the corresponding row or column, wherein the normal numerical clue is displayed in a region of the clue area corresponding to the row or the column;
    display in the clue area a large sized numerical clue simultaneously with the normal numerical clue, wherein the large numerical clue represents the number of cells to be marked in a contiguous form over a plurality of adjoining rows or a plurality of adjoining columns in the matrix, wherein the large sized numerical clue is displayed in a region of the clue area adjacent the rows or columns including the cells corresponding to the number of the large sized numerical clue, and the region spans the plurality of adjoining rows or the plurality of adjoining columns corresponding to the large sized numerical clue;
    identify a cell to be marked, among the cells in the solution area, in accordance with an operation by a player;
    mark and display the identified cell; and
    determine whether or not a set of the marked cells presents a figure which is a correct solution of a puzzle.

2. A puzzle game apparatus comprising:
    a display device;
    a user input device, and
    a processor executing a program stored on a non-transitory storage medium, the program when executed by the processor causes the game apparatus to:
    display on the display device a solution area having a plurality of cells arranged in a matrix of rows and columns;
    perform a connective cell setting process to cause a plurality of cells, among the cells arranged in the solution area, to interrelate with one another;
    perform a connective state process which indicates the cells caused to interrelate with one another by the connective cell setting process to form the connective cell;
    display a clue area in which is displayed a plurality of numbers, each representing a number of cells to be marked among the cells arranged in the solution area, wherein the clue area includes a clue area adjacent the columns and rows of cells in the solution area;
    displaying a normal sized numerical clue, which corresponds to a row or a column in the matrix and represents the number of cells to be marked in the corresponding row or column, wherein the normal sized numerical clue is displayed in a region of the clue area of the display aligned with the corresponding row or column;
    displaying a large sized numerical clue which represents the number of cells of one of the connective cells to be marked in a contiguous form over a plurality of adjoining rows or a plurality of adjoining columns in the matrix, wherein the large sized numerical clue is displayed in a region of the clue area adjacent the rows or columns with the cells represented by the number of the large sized numerical clue and which spans and corresponds to the plurality of adjoining rows or the plurality of adjoining columns, wherein the large sized numerical clue is displayed simultaneously with the small sized numerical clue;

identifying a cell to be marked, among the cells in the solution area, in accordance with an operation by a player;

marking and displaying the identified to be marked cell; and determining whether or not a set of the marked cells presents a figure which is a correct solution of a puzzle; wherein if any of said cells within said connective cell are marked, all of the cells within the connective cell are marked.

3. The puzzle game apparatus according to claim 2, wherein, when the identified cell is included in the connective cell, the cell marking marks all cells in the connective cell.

4. The puzzle game apparatus according to claim 3, wherein the plurality of the cells, which forms the connective cell, is displayed as being connected to one another so as to be displayed as the connective cell on the solution area.

5. The puzzle game apparatus according to claim 3, further comprising, storing cell information regarding each of the cells, and the stored cell information indicates which of the cells are included in the connective cell, wherein the stored cell information is read to determine which of the cells are to interrelate with one another in the connective cell.

6. The puzzle game apparatus according to claim 2, wherein the game program when executed by the processor causes the game apparatus to:

store correct solution information which indicates a marking state corresponding to the correct solution, with respect to each of the cells arranged in the solution area; and read the correct solution information, to generate the normal sized numerical clues and the large sized numerical clues.

7. A puzzle game apparatus, comprising:

a display device;

a user input device, and a processor executing a program stored on a non-transitory storage medium, the program when executed by the processor causes the game apparatus to:

display a solution area having a plurality of cells arranged in a matrix of rows and columns;

perform a connective cell setting process to cause a plurality of cells, among the cells arranged in the solution area, to interrelate with one another so as to form a connective cell;

perform a connective state display process which displays an indication that the cells caused to interrelate with one another by the connective cell setting process form the connective cell;

display a clue area in which a plurality of numbers are to be displayed as clues adjacent corresponding rows or columns of the matrix, each number representing the number of cells in the corresponding rows or columns to be marked, and the numbers each being aligned with the corresponding rows or columns;

display a large sized numerical clue in a region of the clue area adjacent to the rows or columns of the matrix including cells corresponding to the large sized numerical clue, wherein the large sized numerical clue represents the number of cells of the connective cell to be marked in the rows or columns spanning and adjacent to the large sized numerical clue;

identify a cell to be marked among the cells in the solution area, in accordance with an operation by a player;

display as being marked the identified cell; and determine whether or not a set of the marked cells form a figure which is a correct solution of a puzzle.

8. A computer readable non-transitory storage medium having stored thereon a puzzle game program executed by a computer of a game apparatus, the puzzle game program causing the computer to:

display a solution area having a plurality of cells arranged in a matrix thereof;

cause a plurality of cells, among the cells displayed in the solution area, to interrelate with one another so as to form a connective cell;

display a clue area in which a plurality of numbers, each representing the number of cells to be marked among the cells arranged in the solution area, are displayed;

display a small sized numerical clue, which corresponds to a row or a column in the matrix and represents the number of cells to be marked in the row or the column, said small sized numerical clue appearing in a region of the clue area adjacent the row or the column corresponding to the small sized numerical clue;

display a large sized numerical clue, which represents the number of cells in one of the connective cells to be marked in a contiguous form over a plurality of adjoining rows or a plurality of adjoining columns in the matrix, in a region of the clue area aligned with and adjacent plurality of adjoining rows or the plurality of adjoining columns which include the cells represented by the number of the large sized numerical clue, wherein the large sized numerical clue spans the plurality of adjoining rows or the plurality of adjoining columns having cells corresponding to the large sized numerical clue, and wherein the large sized numerical clue is displayed simultaneously with the small sized numerical clue;

identify a cell to be marked, among the cells in the solution area, in accordance with an operation by a player;

mark the identified cell, wherein the marking of the identified cell causes all cells to be marked that are within the connective cell which includes the identified cell;

display all of the cells in the connective cell as being marked; and determine whether or not a set of marked cells presents a figure which is a correct solution of a puzzle.

9. A computer readable non-transitory storage medium having stored thereon a puzzle game program executed by a computer of a game apparatus, the puzzle game program causing the computer to:

display a solution area having a plurality of cells arranged in a matrix;

display a clue area adjacent to the solutions area;

display a normal sized numerical clue which corresponds to a row or a column in the matrix and represents the number of cells to be marked in the row or the column, wherein the normal sized numerical clued is displayed in a region of the clue area corresponding to the row or the column;

display a large sized numerical clue which represents the number of cells to be marked in a contiguous form over a plurality of adjoining rows or a plurality of adjoining columns in the matrix, the large sized numerical clue displayed in a region of the clue area spanning and adjacent to the plurality of adjoining rows or the plurality of adjoining columns having the cells represented by the number of the large sized numerical clue, wherein the region spans and corresponds to the plurality of adjoining rows and the plurality of adjoining columns and the large sized numerical clue is displayed simultaneously with the normal sized numerical clue;

identify a cell to be marked, among the cells in the solution area, in accordance with an operation by a player;

mark and display the identified cell; and determine whether or not a set of marked cells presents a figure which is a correct solution of a puzzle.

10. A puzzle game system comprising:

a display device showing a matrix of cells and an adjacent clue area;

a user input device, a processor and a non-transitory storage medium storing a program which when executed by the processor causes the game apparatus to:

define connective cells each including cells in the matrix which are connected and interrelated, and a group of the connective cells form a solution group;

display in the clue area a first type of numerical clues each aligned with a row or column of the matrix, wherein the numerical clues of the first type each indicate a number of cells in the row or column aligned with the numerical clue of the first type included in one of the connective cells;

display in the clue area a second type of numerical clues which each indicate a number of cells in one of the connective cells, wherein each of the numerical clues of the second type is adjacent, spans and aligned with the rows or columns having the cells of the one of the connective cells corresponding to the clue of the second type;

repeatedly receive inputs made by the user wherein each input marks a cell in the solution area;

display each of the marked cells in the matrix, and correlate the marked cells to the solution group; wherein if any of said cells within said connective cell are marked, all of the cells within the connective cell are marked.

11. The system of claim 10 wherein all of the cells in each connective cell interrelate by automatically being displayed as marked cells when any one of the cells in the connective cell is marked.

12. The system of claim 10, wherein the processor further causes the game apparatus to determine if the marked cell is in one of the connective cells and thereafter displays as being marked all cells in the one connective cell.

13. The system of claim 10 wherein the storage medium stores cell information indicating whether each cell in the solution area is in one of the connective cells, and the processor further causes the game apparatus to read the cell information to determine whether the cell marked by the user input is included in one of the connective cells, and upon determining that the marked cell is in one of the connective cells, display as being marked all cells in the one connective cell.

14. The system of claim 10, wherein the storage medium stores information indicating which cells in the solution area are in each of the connective cells, and the processor further causes the game apparatus to:

generate the small sized and large sized numerical clues based on the information indicating which cells are in each of the connective cells.

15. A method to play a puzzle game using a display device showing a matrix of cells and an adjacent clue area, a user input device, the method comprising:

defining connective cells each including cells in the matrix which are connected and interrelated, and a group of the connective cells are included in a solution group wherein if any of said cells within said connective cell are marked, all of the cells within the connective cell are marked;

displaying in the clue area small sized numerical clues each aligned with a row or column of the matrix, wherein the small sized numerical clues each indicate a number of cells in the row or column aligned with the small sized numerical clue included in one of the connective cells;

displaying in the clue area large sized numerical clues which each indicate a number of cells in one of the connective cells, wherein each of the large sized numerical clues spans and is aligned with the rows or columns having the cells of the one of the connective cells corresponding to the large numerical clue;

repeatedly receiving inputs made by a user wherein each input marks a cell in the solution area, wherein all cells are automatically marked that are within the connective cell which includes the cell marked by the input;

displaying each of the marked cells in the matrix, and correlating the marked cells with the solution group.

16. The method of claim 15 further comprising automatically displaying as marked cells all of the cells in one of the connective cells when any one of the cells in the one of the connective cells is marked by one of the user inputs.

17. The method of claim 15 further comprising determining if the cell marked by the user input is in one of the connective cells and displaying as being marked all cells in the one connective cell.

18. A computer readable non-transitory storage medium having stored thereon a puzzle game program executed by a computer of a game apparatus, the puzzle game program causing the computer to:

display a solution area having puzzles cells arranged in a matrix thereof;

set a plurality of connective cells each of which include a plurality of the puzzle cells;

display large sized numerical clues in a clue area adjacent to the solutions area, wherein each large sized numerical clue indicates a number of puzzle cells in one of the connective cells which are in the rows or the columns that are adjacent to and span the large seed numerical clue;

repeatedly identify individual puzzle cells in the solutions area to be marked in accordance with an operation by a player and displaying as being marked each of the identified puzzle cells;

in conjunction with each identification of the individual puzzle cells, identify each of the connective cells which includes the identified puzzle cell;

automatically display an indication the puzzle cells in the identified connective cell are interrelated; and determine whether the marked cells form a correct solution of a puzzle.

19. In the computer readable non-transitory storage memory of claim 18 wherein the automatic display of the indication includes showing as being marked all of the puzzle cells in the identified connective cell.

20. A puzzle game system comprising:

a display device showing a matrix of cells and an adjacent clue area;

a user input device, a processor and a non-transitory storage medium storing a program which when executed by the processor causes the game apparatus to:

display a solution area having puzzles cells arranged in a matrix thereof;

set a plurality of connective cells each of which include a plurality of the puzzle cells;

display large sized numerical clues in a region of the solution area adjacent to rows or columns of the matrix, each large sized numerical clue spans rows or columns in the matrix and indicates a number of puzzle cells in one of the connective cells that are aligned with the large sized numerical clue;

repeatedly identify individual puzzle cells in the solutions area to be marked in accordance with an operation by a player and displaying as being marked each of the identified puzzle cells;

in conjunction with each identification of the individual puzzle cells, identify each of the connective cells which includes the identified puzzle cell;

automatically display an indication the puzzle cells in the identified connective cell are interrelated; and determine whether the marked cells form a correct solution of a puzzle.

21. The puzzle game system of claim 20 wherein the automatic display of the indication includes showing as being marked all of the puzzle cells in the identified connective cell.

22. A method to play a puzzle game using a display device showing a matrix of cells and an adjacent clue area, a user input device, the method comprising:

display a solution area having puzzles cells arranged in a matrix thereof;

set a plurality of connective cells each of which include a plurality of the puzzle cells, wherein if any one of the cells within one of said connective cells is determined to have been identified by an operation of the player, all of the cells within the connective cell are marked;

display large sized numerical clues in a region of the solutions area adjacent to rows or columns of the matrix, each large sized numerical clue spans rows or columns in the matrix and indicates a number of puzzle cells in one of the connective cells that are aligned with the large sized numerical clue;

repeatedly identifying individual puzzle cells in the solutions area to be marked in accordance with the operation by a player and displaying as being marked each of the identified puzzle cells;

in conjunction with each identification of the individual puzzle cells, identify each of the connective cells which includes the identified puzzle cell;

automatically display an indication that all of the puzzle cells in the identified connective cell are interrelated; and determine whether the marked cells form a correct solution of a puzzle.

23. The method of claim 22 wherein the automatic display of the indication includes showing as being marked all of the puzzle cells in the identified connective cell.

24. A puzzle game system including a processor which executes a program stored in a non-transitory memory accessible by the processor, wherein the program when executed by the processor causes the system to:

generate an image including a solution area having a plurality of cells arranged in a matrix of rows and columns and a clue area adjacent the rows and cells;

display the image using a display device;

establish connective cells wherein each connective cell includes a group of contiguous cells in the matrix, wherein if any one of the cells within one of said connective cells is determined to have been identified by an operation of the player, all of the cells within the connective cell are marked;

generate normal sized numerical clues and large sized numerical clues each corresponding to one of the connective cells, wherein each of the normal sized and large sized numerical clues indicate a number of cells to be marked in the corresponding connective cell;

display using the display device the normal sized numerical clues in the clue area, wherein each normal sized numerical clue is aligned with just one row or column and the number indicated by the normal sized numerical clue identifies the number of cells in the aligned row or column in the connective cell corresponding to the normal sized numerical clue;

display using the display device the large sized numerical clues in a region of the clue area adjacent the rows or columns including the cells corresponding to the number of the large sized numerical clue, and wherein each large sized numerical clue spans a plurality of adjacent rows or adjacent columns and the number indicated by the large sized numerical clue identifies the number of cells in the aligned, adjacent rows or columns in the connective cell corresponding to the large sized numerical clue;

identifying a cell to be marked in the solution area based on an operation by a player;

marking the identified to be marked cell, wherein all of the sells within the connective which includes the identified to be marked cell are also marked;

display all of the cells in the connective cell as being marked;

for a plurality of cells, repeating the steps of identifying the cell and marking and displaying the identified cell, and determining whether the marked cells presents a figure which is a correct solution of a puzzle.

25. A puzzle game system including a processor executing a program stored on a non-transitory storage medium, the program when executed by the processor causes the system to:

display using a display device a solution area having a plurality of cells arranged in a matrix;

display a clue area in which a plurality of numbers each representing a number of cells to be marked, wherein the clue area is adjacent the cells in the solution area;

display in the clue area a normal numerical clue which corresponds to a row or a column in the matrix and represents the number of cells to be marked in the corresponding row or column, wherein the normal numerical clue is displayed in a region of the clue area corresponding to the row or the column;

display in the clue area a large sized numerical clue, which represents the number of cells to be marked in a contiguous form over a plurality of adjoining rows or a plurality of adjoining columns in the matrix, wherein the large sized numerical clue is displayed in a region of the clue area adjacent the rows or columns including the cells corresponding to the number of the large sized numerical clue, and the region spans the plurality of adjoining rows or the plurality of adjoining columns corresponding to the large sized numerical clue;

identify a cell to be marked, among the cells in the solution area, in accordance with an operation by a player;

mark and display the identified cell; and determine whether or not a set of the marked cells presents a figure which is a correct solution of a puzzle.

\* \* \* \* \*